US012791961B2

(12) United States Patent
Munetsugu et al.

(10) Patent No.: US 12,791,961 B2
(45) Date of Patent: Nov. 10, 2026

(54) ACCOMMODATING CONTAINER AND IMAGE FORMING SYSTEM

(71) Applicant: CANON KABUSHIKI KAISHA, Tokyo (JP)

(72) Inventors: Hiroyuki Munetsugu, Kanagawa (JP); Hiroshi Takarada, Kanagawa (JP); Norihiko Ochi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/938,540

(22) Filed: Nov. 6, 2024

(65) Prior Publication Data

US 2025/0060690 A1 Feb. 20, 2025

Related U.S. Application Data

(60) Division of application No. 18/142,175, filed on May 2, 2023, now Pat. No. 12,169,374, which is a (Continued)

(30) Foreign Application Priority Data

Dec. 15, 2020 (JP) ................................ 2020-207264
Oct. 21, 2021 (JP) ................................ 2021-172315

(51) Int. Cl.
*G03G 15/08* (2006.01)
*B65H 45/04* (2006.01)
*G03G 15/00* (2006.01)

(52) U.S. Cl.
CPC ......... *G03G 15/0822* (2013.01); *B65H 45/04* (2013.01); *G03G 15/5008* (2013.01); *G03G 2215/018* (2013.01)

(58) Field of Classification Search
CPC .............. B65D 75/008; B65D 75/5883; B65D 2575/583; B65D 31/02; G03G 21/1821; G03G 15/0886
See application file for complete search history.

(56) References Cited

U.S. PATENT DOCUMENTS 4,232,721 A 11/1980 Martin
4,308,904 A 1/1982 Marlin et al.
(Continued)

FOREIGN PATENT DOCUMENTS

JP S55-143166 A 11/1980
JP H08-30084 A 2/1996
(Continued)

OTHER PUBLICATIONS

International Search Report and Written Opinion for International Patent Application No. PCT/JP2021/046399.
(Continued)

*Primary Examiner* — Jessica L Eley
(74) *Attorney, Agent, or Firm* — Venable LLP

(57) ABSTRACT

An accommodating container includes a flexible pouch including a bottom portion and a side portion extending from the bottom portion so as to form an opening and a communicating member disposed inside the side portion on a side of the opening and provided with a communicating portion communicating between inside and outside of the pouch. The communicating member includes an opposite surface opposing the bottom portion, and the side portion includes a fold forming portion forming a folding shape along an edge portion of the opposite surface of the communicating member.

9 Claims, 12 Drawing Sheets

Related U.S. Application Data continuation of application No. PCT/JP2021/046399, filed on Dec. 9, 2021.

(56) References Cited

U.S. PATENT DOCUMENTS

| | | | | |
|---|---|---|---|---|
| 5,426,492 | A * | 6/1995 | Diehl | G03G 15/0875 399/257 |
| 6,519,436 | B2 * | 2/2003 | Katsuyama | G03G 15/0874 229/117.27 |
| 7,248,824 | B2 | 7/2007 | Takami | |
| 7,426,362 | B2 | 9/2008 | Takami | |
| 7,590,374 | B2 | 9/2009 | Takami | |
| 7,734,230 | B2 | 6/2010 | Takami | |
| 2005/0117936 | A1 | 6/2005 | Takami | |
| 2007/0242984 | A1 | 10/2007 | Takami | |
| 2008/0063435 | A1 | 3/2008 | Takami | |
| 2009/0016777 | A1 * | 1/2009 | Miyamoto | G03G 15/0855 399/238 |
| 2009/0074471 | A1 | 3/2009 | Takami | |
| 2009/0290903 | A1 | 11/2009 | Horikawa et al. | |
| 2009/0290904 | A1 | 11/2009 | Kawai et al. | |
| 2009/0297202 | A1 | 12/2009 | Takarada | |
| 2009/0297214 | A1 | 12/2009 | Chadani et al. | |
| 2009/0297215 | A1 | 12/2009 | Munetsugu et al. | |
| 2011/0280621 | A1 | 11/2011 | Suzuki et al. | |
| 2013/0022368 | A1 | 1/2013 | Takarada et al. | |
| 2013/0039678 | A1 | 2/2013 | Yoshida et al. | |
| 2013/0114972 | A1 | 5/2013 | Takarada et al. | |
| 2013/0121720 | A1 | 5/2013 | Hoshi et al. | |
| 2013/0170851 | A1 | 7/2013 | Takarada et al. | |
| 2015/0037065 | A1 | 2/2015 | Takarada et al. | |
| 2015/0139684 | A1 | 5/2015 | Nakazawa et al. | |
| 2015/0253723 | A1 | 9/2015 | Morioka et al. | |
| 2015/0284145 | A1 | 10/2015 | Arimoto | |
| 2015/0367614 | A1 * | 12/2015 | Sasaki | B32B 27/32 428/522 |
| 2016/0257041 | A1 | 9/2016 | Takarada et al. | |
| 2017/0261926 | A1 | 9/2017 | Kashiide et al. | |
| 2017/0261927 | A1 | 9/2017 | Sato et al. | |
| 2018/0039206 | A1 | 2/2018 | Hoshi et al. | |
| 2018/0253057 | A1 | 9/2018 | Koishi et al. | |
| 2018/0321637 | A1 | 11/2018 | Sato et al. | |
| 2019/0009950 | A1 | 1/2019 | Farstad | |
| 2019/0179258 | A1 | 6/2019 | Kashiide et al. | |
| 2019/0258202 | A1 | 8/2019 | Kamoshida et al. | |
| 2019/0291933 | A1 * | 9/2019 | Nunez | B32B 27/308 |
| 2020/0142353 | A1 | 5/2020 | Sato et al. | |
| 2020/0249623 | A1 | 8/2020 | Sato et al. | |
| 2020/0409304 | A1 | 12/2020 | Kashiide et al. | |
| 2021/0263467 | A1 | 8/2021 | Sato et al. | |
| 2021/0311431 | A1 | 10/2021 | Kashiide et al. | |
| 2022/0035307 | A1 | 2/2022 | Munetsugu et al. | |
| 2022/0155708 | A1 | 5/2022 | Sato et al. | |
| 2022/0155722 | A1 | 5/2022 | Kashiide et al. | |
| 2022/0197211 | A1 | 6/2022 | Sato et al. | |
| 2022/0404738 | A1 | 12/2022 | Toba et al. | |
| 2022/0413414 | A1 | 12/2022 | Ozaki et al. | |
| 2023/0017354 | A1 | 1/2023 | Ozaki et al. | |
| 2023/0031856 | A1 | 2/2023 | Munetsugu et al. | |
| 2023/0096202 | A1 | 3/2023 | Sato et al. | |
| 2023/0176503 | A1 | 6/2023 | Fukui et al. | |
| 2023/0185234 | A1 | 6/2023 | Kashiide et al. | |
| 2023/0205114 | A1 | 6/2023 | Ozaki et al. | |
| 2023/0205129 | A1 | 6/2023 | Suetsugu et al. | |
| 2023/0244157 | A1 | 8/2023 | Kubo et al. | |
| 2023/0297024 | A1 | 9/2023 | Sato et al. | |
| 2023/0324829 | A1 | 10/2023 | Munetsugu et al. | |
| 2024/0045367 | A1 | 2/2024 | Uoo et al. | |

FOREIGN PATENT DOCUMENTS

| | | | |
|---|---|---|---|
| JP | 2005-070449 | A | 3/2005 |
| JP | 2006-184918 | A | 7/2006 |
| JP | 2012-053423 | A | 3/2012 |
| JP | 2012-163808 | A | 8/2012 |
| JP | 2014-174443 | A | 9/2014 |

OTHER PUBLICATIONS

Jul. 15, 2025 Office Action in Japanese Patent Application Pub. No. 2021-172315 (with English translation).

* cited by examiner (a)

(b)

ACCOMMODATING CONTAINER AND IMAGE FORMING SYSTEM

CROSS REFERENCE TO RELATED APPLICATIONS

This application is a division of prior application Ser. No. 18/142,175, filed on May 2, 2023.

TECHNICAL FIELD

The present invention relates to an accommodating container for accommodating powder and an image forming system for forming images on a recording material using the accommodating container.

BACKGROUND ART

Generally, an electrophotographic image forming apparatus forms an image by transferring a toner image formed on a surface of a photosensitive drum to a transfer material as a transfer medium. And as a developer supply system, for example, a process cartridge system and a toner supply system are known. The process cartridge system is a system in which the photosensitive drum and a developer container are integrated as a process cartridge, and when a developer runs out, the process cartridge is replaced with a new one.

On the other hand, the toner supply system is a system in which a toner is supplied newly to the developer container when the toner runs out. Conventionally, in the Japanese Patent Application Laid-Open No. H08-30084, a one-component developing device of the toner supply system to which a toner supply box that can supply the toner to a toner conveyance path conveying the toner is connected is suggested. The toner stored in the toner supply box is conveyed to the toner conveyance path by a conveyance screw.

SUMMARY OF THE INVENTION

Problem to be Solved by the Invention

In recent years, a variety of uses and forms regarding toner supplying containers for image forming apparatus are demanded from users.

An object of the present invention is to provide a new form of an accommodating container capable of accommodating powder and an image forming system with further improved operability.

Means for Solving the Problem

An accommodating container of the present invention is an accommodating container for accommodating powder, the accommodating container comprising:

a flexible pouch including a bottom portion and a side portion extending from the bottom portion so as to form an opening; and a communicating member disposed inside the side portion on a side of the opening and provided with a communicating portion communicating between inside and outside of the pouch, wherein the communicating member includes an opposite surface opposing the bottom portion, and wherein the side portion is provided with a fold forming portion forming a folding shape along an edge portion of the opposite surface of the communicating member.

In addition, an image forming system of the present invention comprising:

an accommodating container accommodating a developer and described above, and an image forming apparatus provided with a mounting portion on which the accommodating container is mounted, wherein the image forming system performs an image forming operation by using the developer supplied from the accommodating container.

Effect of the Invention

According to the present invention, it is possible to provide a new form of an accommodating container for accommodating powder and an image forming system having further improved operability.

BRIEF DESCRIPTION OF THE DRAWINGS

Part (a) of FIG. 1 is a cross-sectional view illustrating an image forming apparatus according to an Embodiment 1, and Part (b) of FIG. 1 is a perspective conceptual view illustrating the image forming apparatus.

Figure 3:
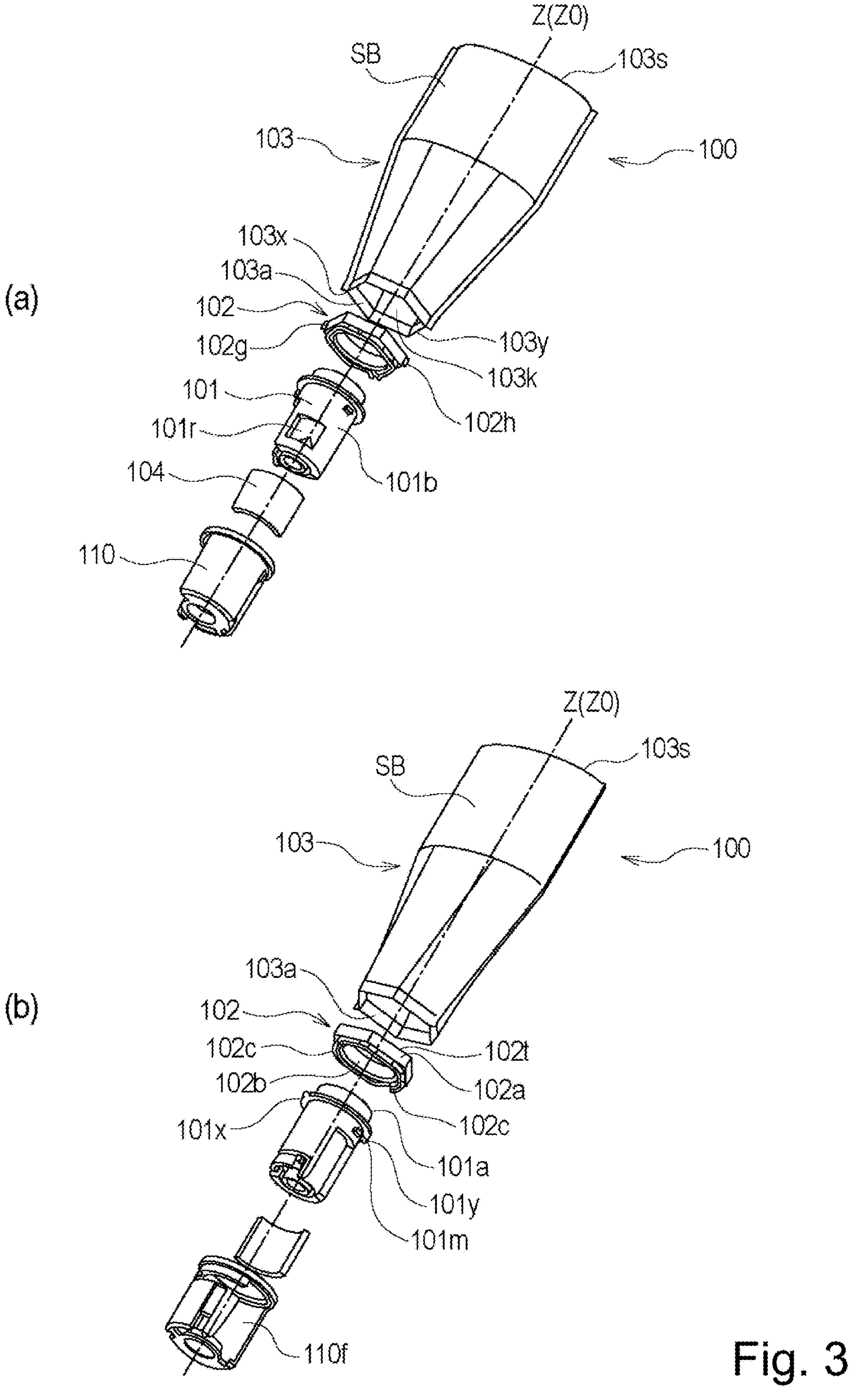

Part (a) and part (b) of FIG. 3 are exploded perspective conceptual views of a toner pack according to the Embodiment 1 viewed from different perspectives.

Figure 4:
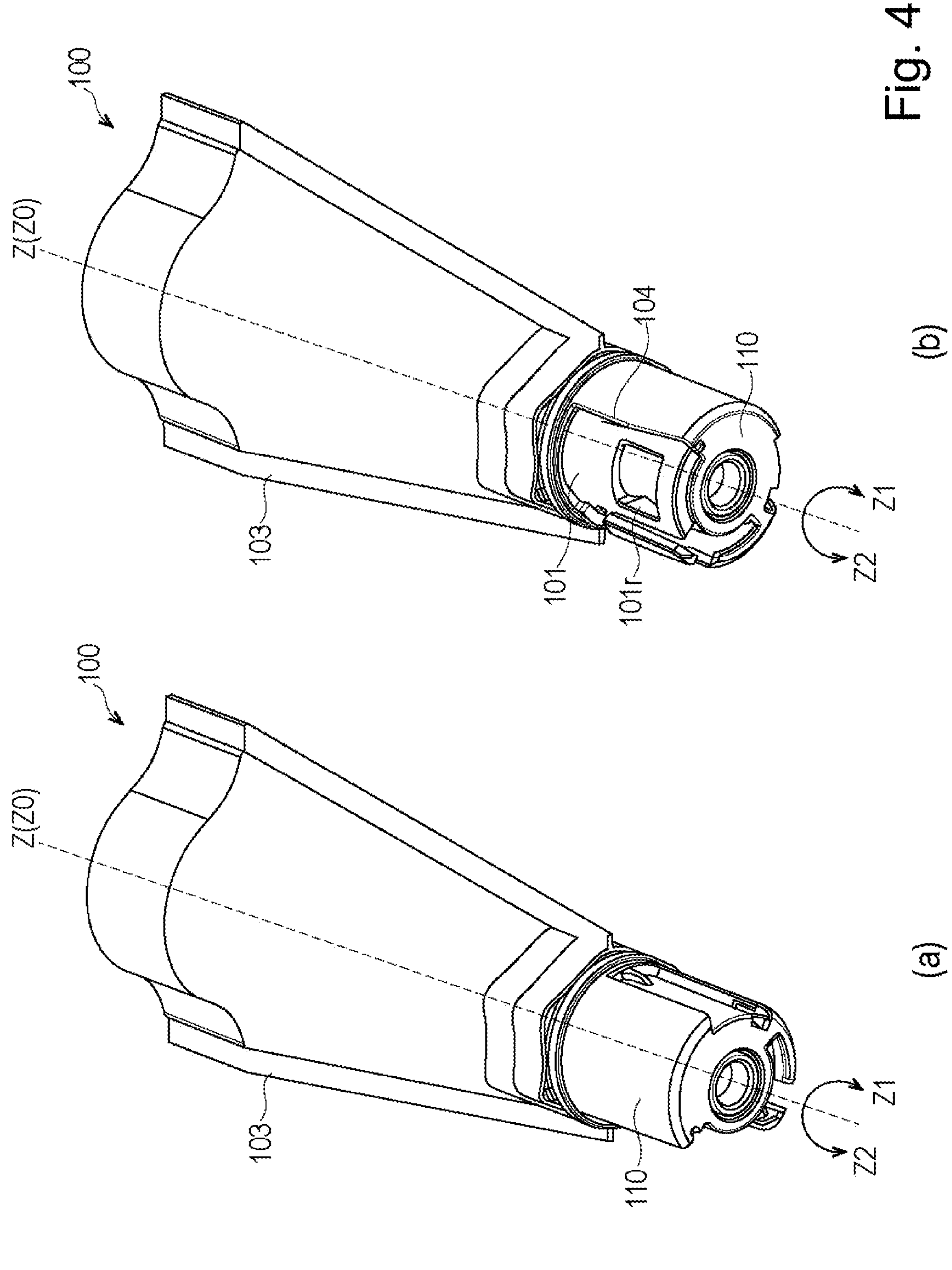

Part (a) of FIG. 4 is a perspective conceptual view illustrating a state where a discharge port of the toner pack according to the Embodiment 1 is shuttered, and Part (b) of FIG. 4 is a perspective conceptual view illustrating a state where the discharge port of the toner pack is opened.

Figure 5:
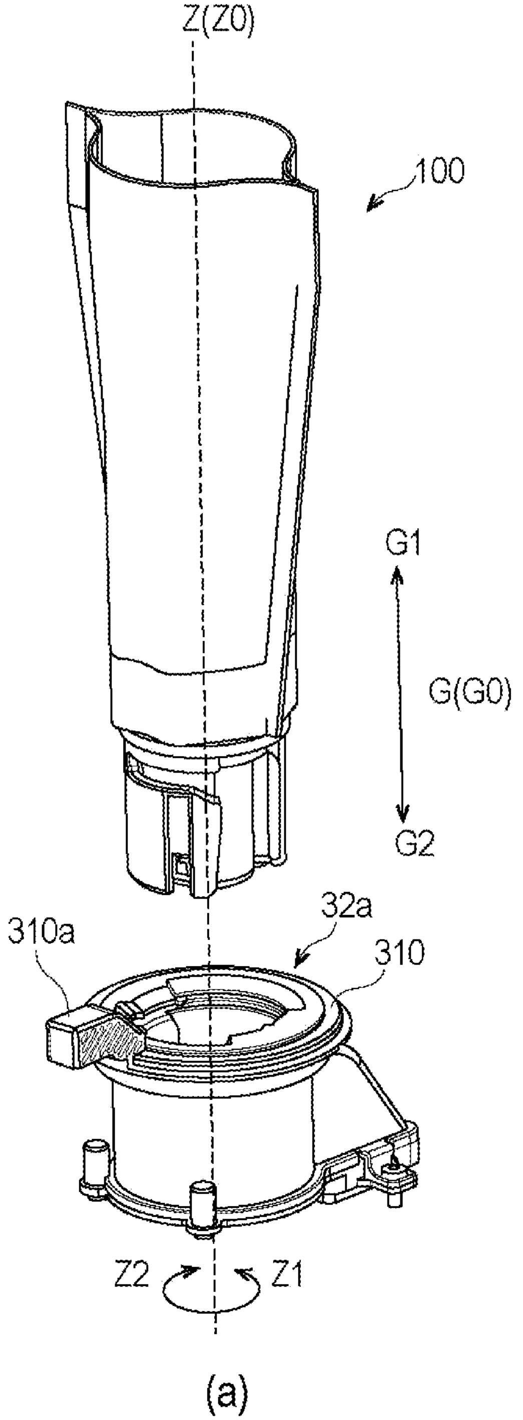

Part (a) of FIG. 5 is a perspective conceptual view illustrating a state just before the toner pack according to the Embodiment 1 is mounted on a supply port, and Part (b) of FIG. 5 is a perspective conceptual view illustrating a state where the toner pack is mounted on the supply port.

Figure 6:
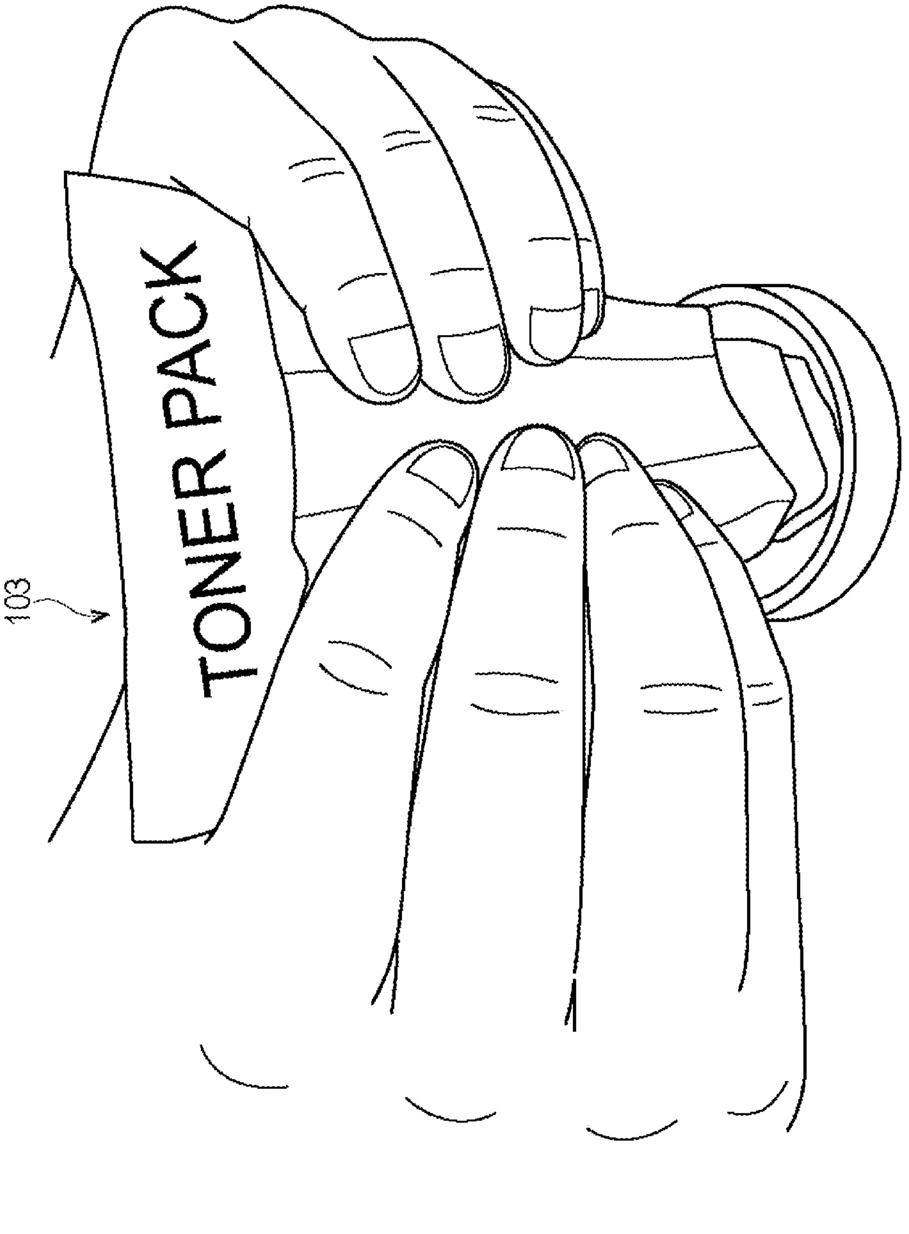

FIG. 6 is a perspective conceptual view illustrating a method discharging a toner from the toner pack according to the Embodiment 1.

Figure 7:
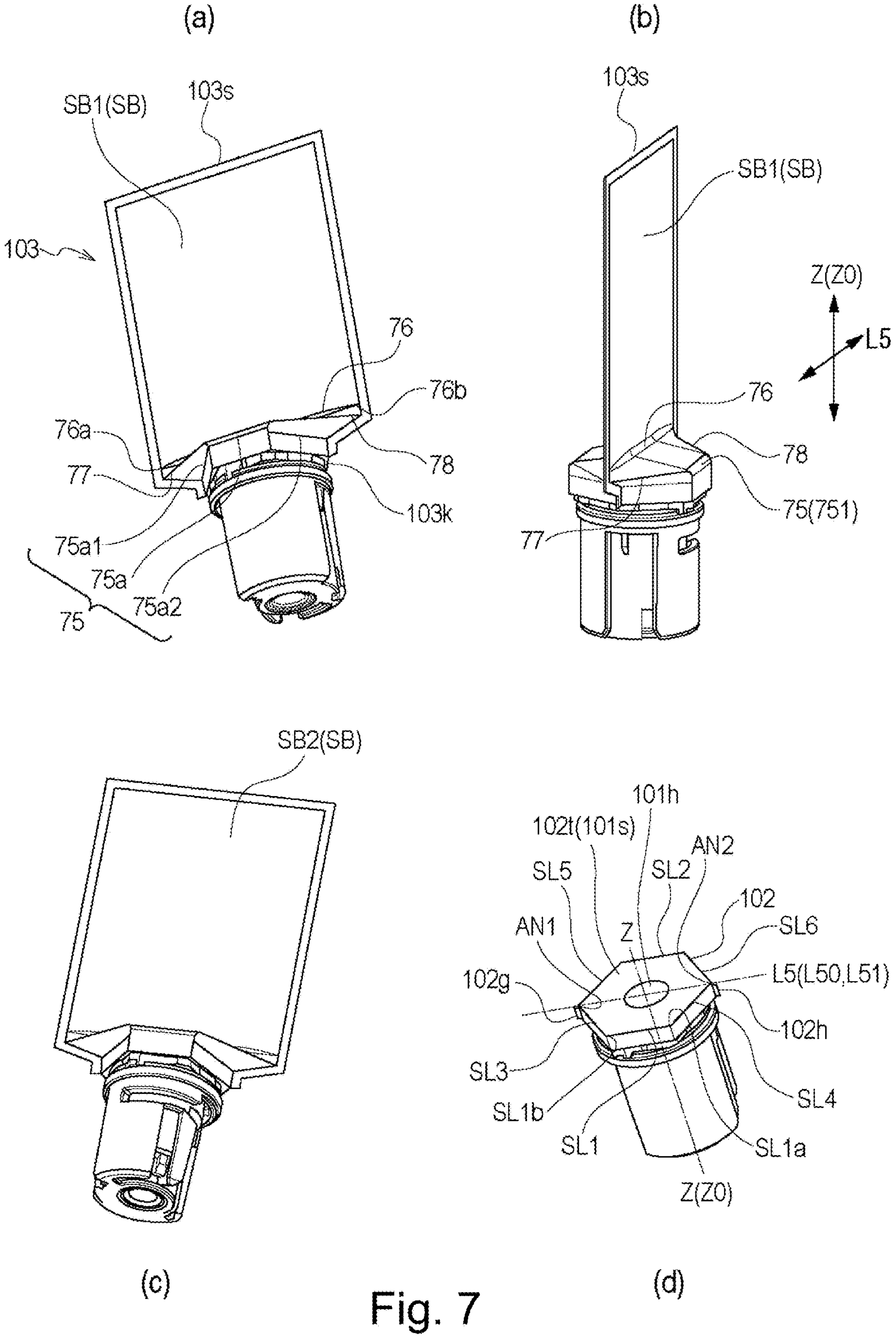

Part (a), part (b) and part (c) of FIG. 7 are perspective conceptual views of the toner pack according to the Embodiment 1 in a state where supply is completed viewed from different perspectives. Part (d) of FIG. 7 is a perspective conceptual view illustrating the toner pack in a state where a pouch is made to be invisible.

Figure 8:
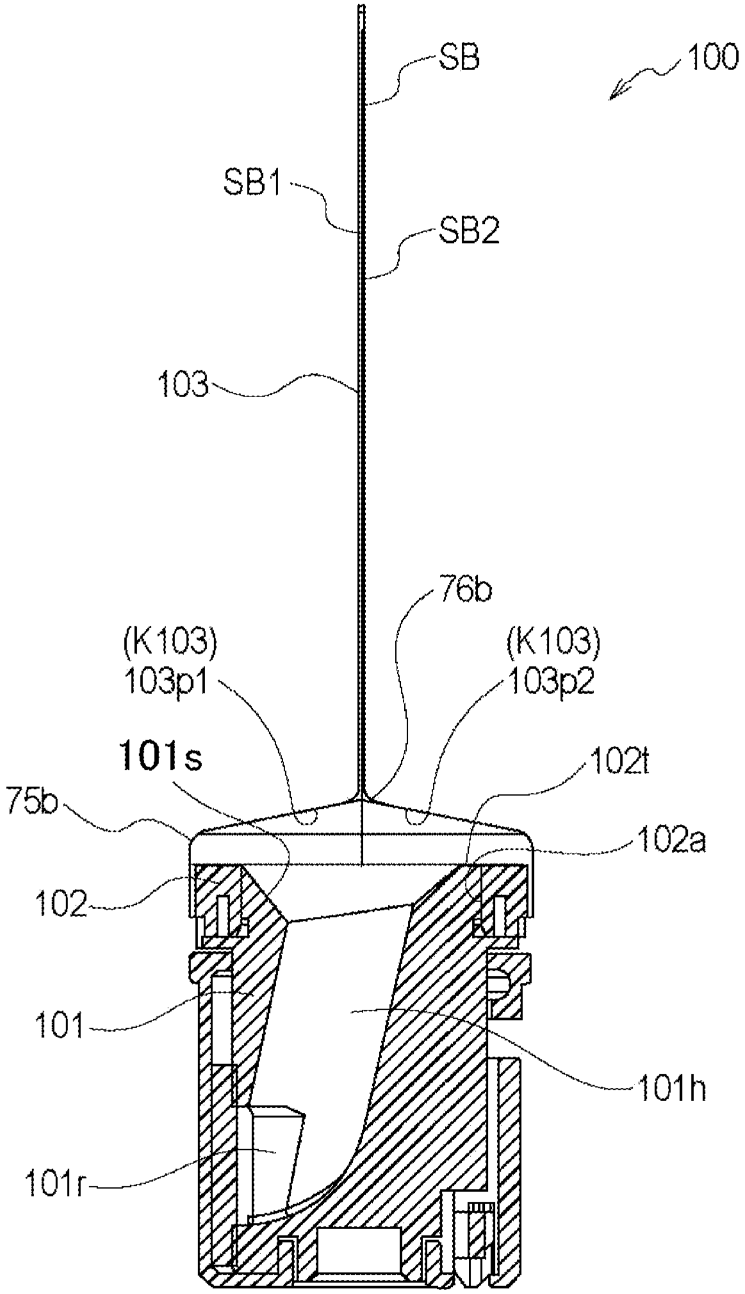

FIG. 8 is a perspective conceptual view illustrating the state where supply is completed of the toner pack according to the Embodiment 1.

Figure 9:
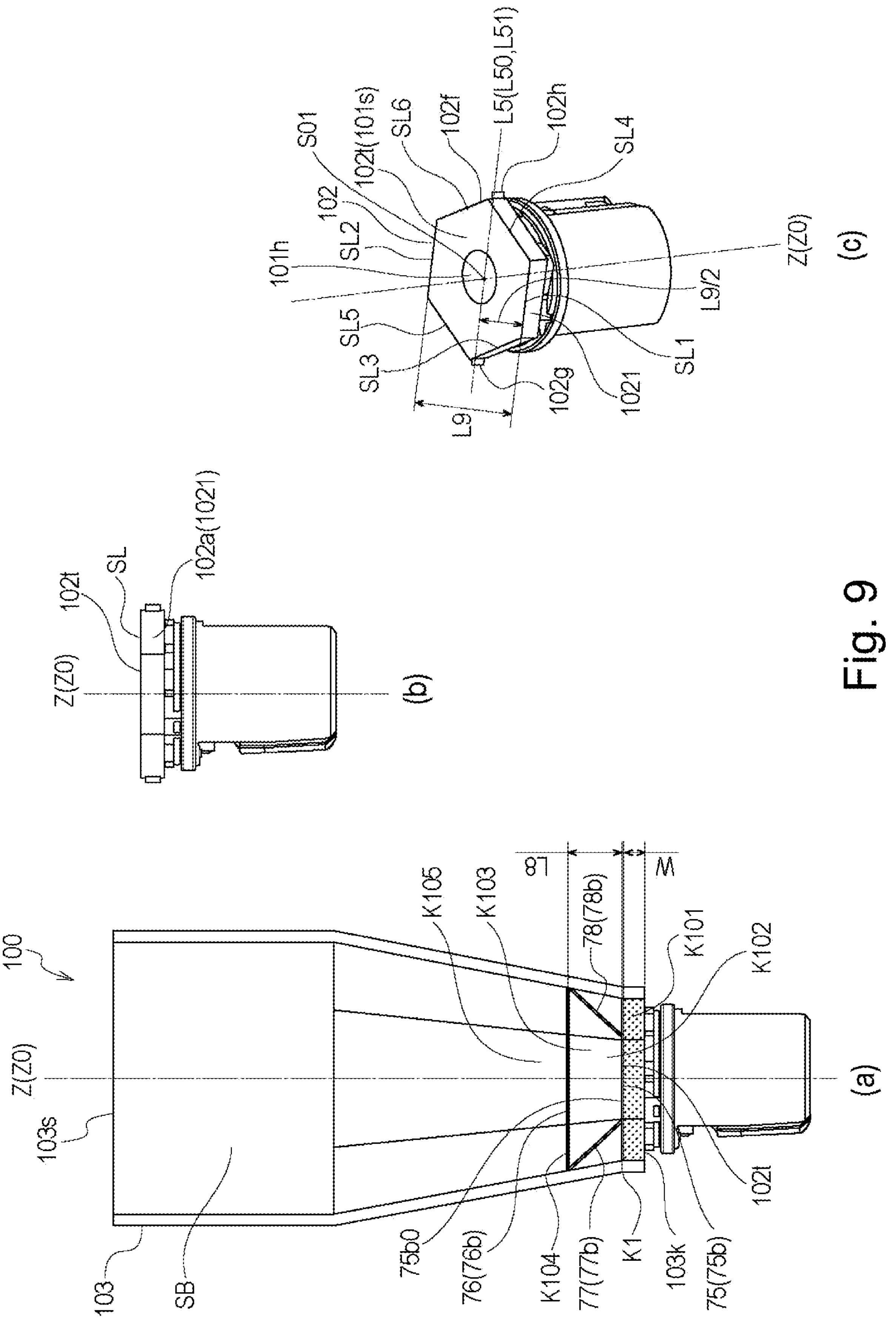

Part (a) of FIG. 9 is a side conceptual view illustrating a position of a fold forming portion disposed on a side portion of the pouch of the toner pack according to the Embodiment 1, Part (b) of FIG. 9 is a side conceptual view illustrating the toner pack in a state where the pouch is made to be invisible, Part (c) of Figure is a perspective conceptual view illustrating the toner pack in a state where the pouch is made to be invisible.

Figure 10:
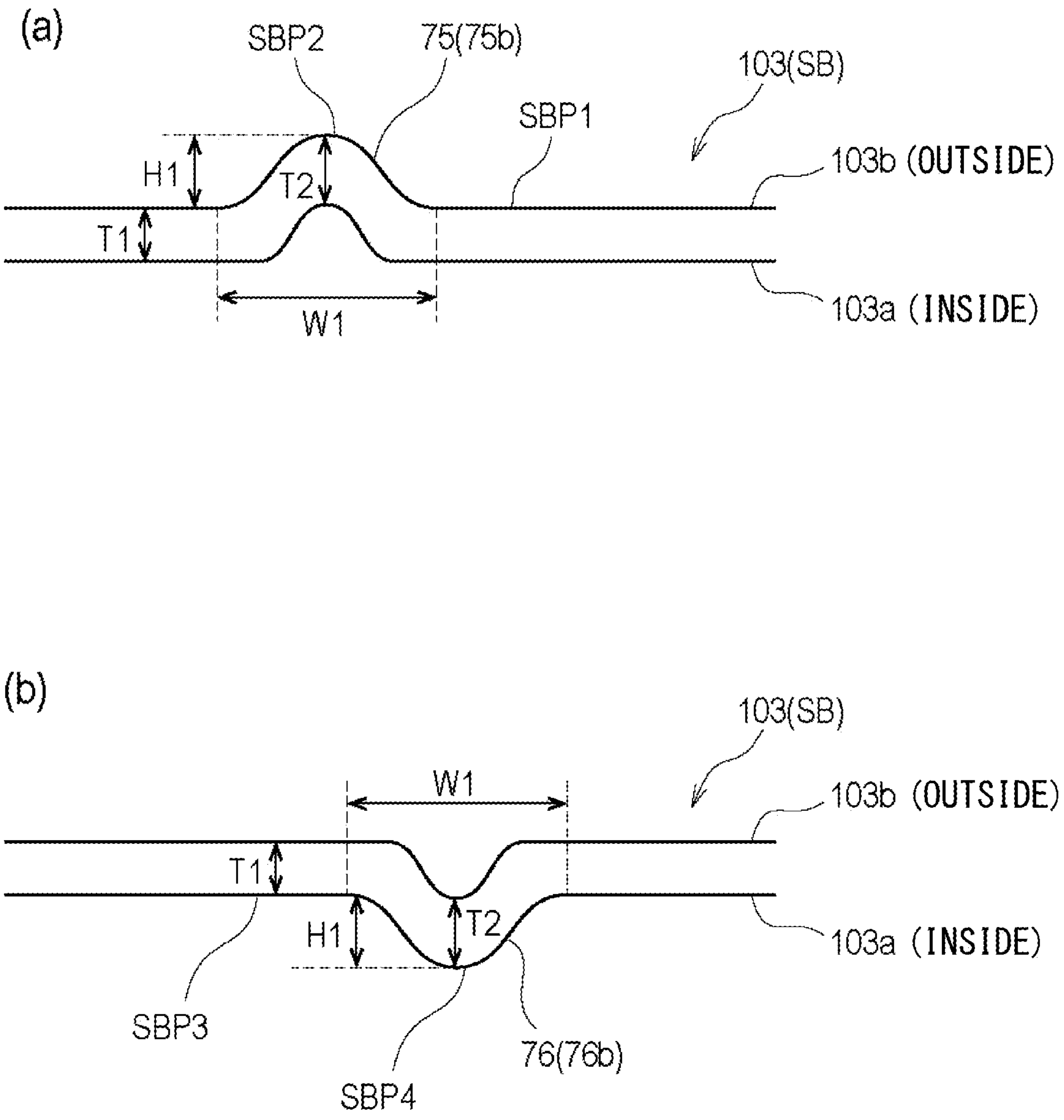

Part (a) of FIG. 10 is a cross-sectional conceptual view of the fold forming portion of the side portion of the pouch in the toner pack according to the Embodiment 1, and Part (b) of FIG. 10 is a cross-sectional conceptual view of a second fold forming portion of the side portion of the pouch.

Figure 11:
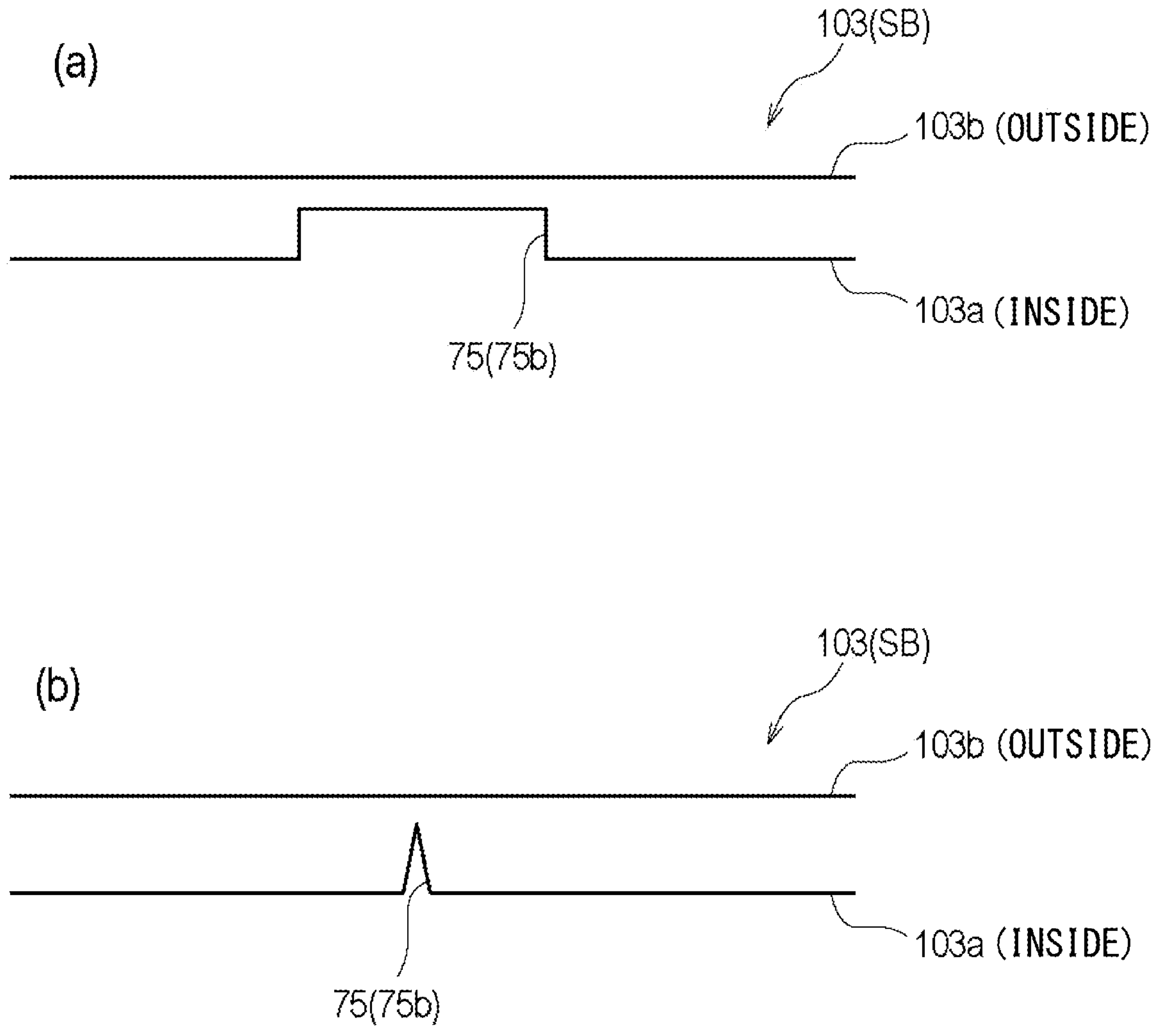

Part (a) of FIG. 11 is a cross-sectional conceptual view of the fold forming portion of the side portion of the pouch in the toner pack according to a modification example 1 of the Embodiment 1, and Part (b) of FIG. 11 is a cross-sectional conceptual view of the fold forming portion of the side portion of the pouch in the toner pack according to a modification example 2 of the Embodiment 1.

Figure 12:
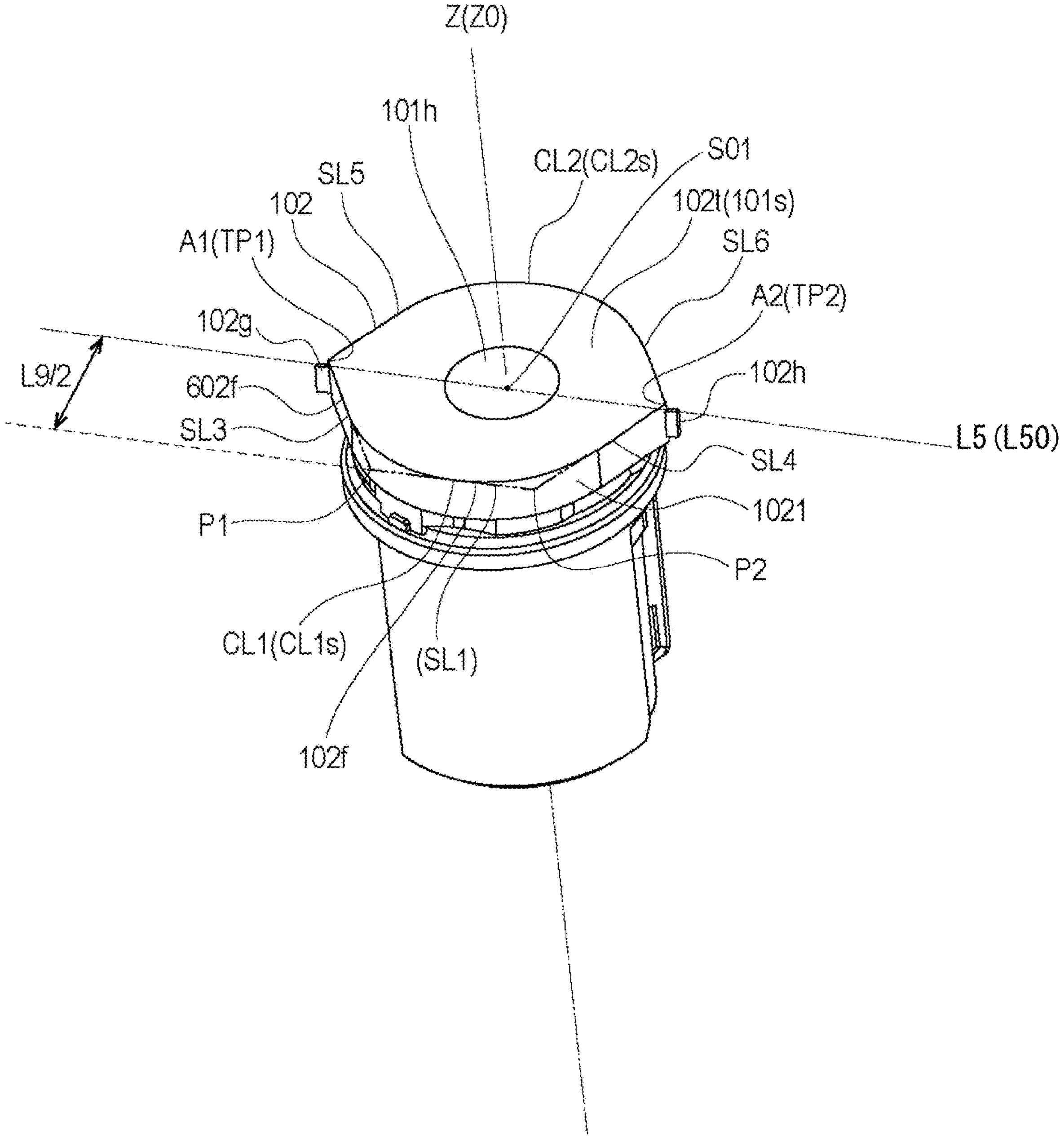

FIG. 12 is a perspective conceptual view illustrating a toner pack according to an Embodiment 2 in a state where a pouch is made to be invisible.

EMBODIMENTS OF THE INVENTION

Hereinafter, exemplary embodiments for implementing the present invention will be described with reference to the drawings.

Embodiment 1

Figure 1:
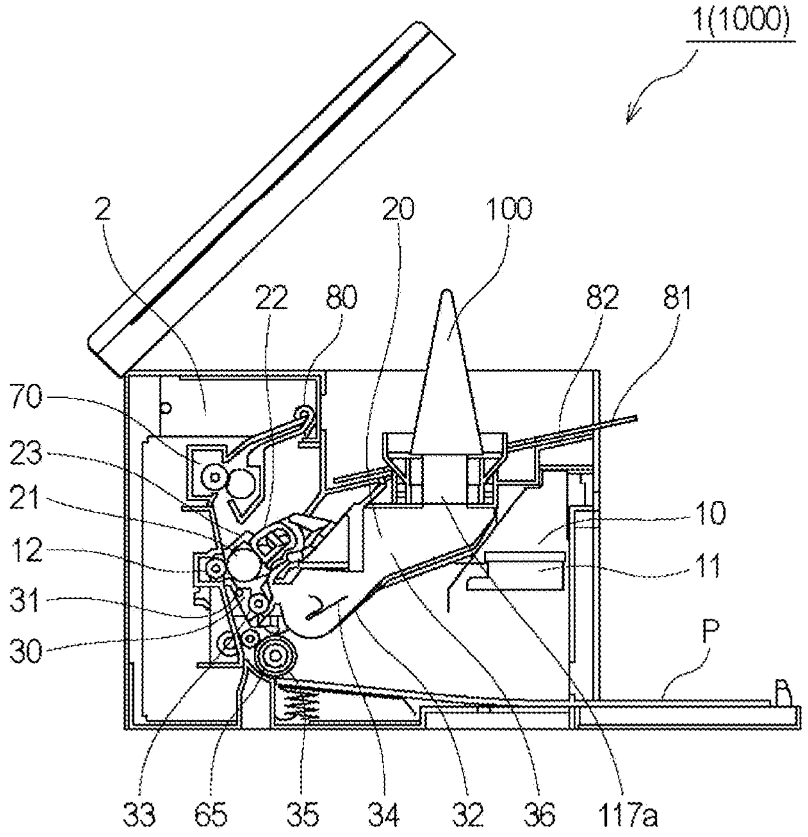
Figure 1:
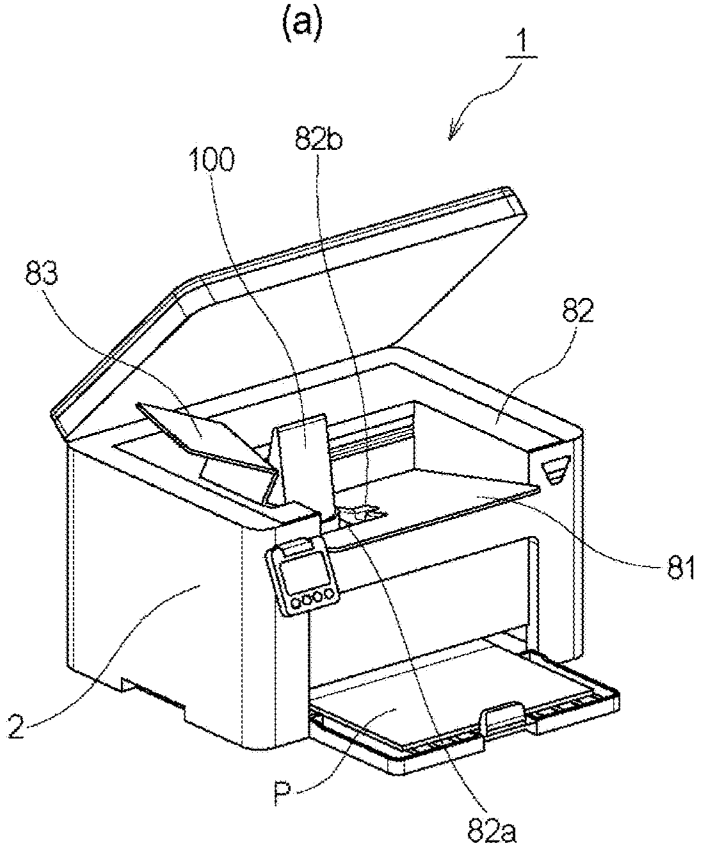

FIG. 1(*a*) is a cross-sectional conceptual view illustrating an image forming apparatus 1 according to an Embodiment 1, and FIG. 1(*b*) is a perspective conceptual view illustrating the image forming apparatus 1.

In the present Embodiment, the image forming apparatus 1 is a monochromatic printer which forms an image on a recording material P based on an image information inputted from an external device. The recording material P may be various sheet materials such as papers such as plain paper and thick paper, plastic films such as sheets for overhead projectors, sheets having a special shape such as envelopes and index papers, or various sheet materials made of different materials such as cloth.

(Overall Structure of Image Forming Apparatus)

As shown in FIG. 1(*a*) and FIG. 1(*b*), in the present Embodiment, the image forming apparatus 1 includes an image forming portion 10 that forms a toner image on the recording material P, a pickup roller 65 that feeds the recording material P to the image forming portion 10, a fixing portion 70, and a discharging roller pair 80. Incidentally, the fixing portion 70 is what fixes the toner image formed by the image forming portion 10 on the recording material P.

In addition, the image forming portion 10 includes a scanner unit 11, an electrophotographic process cartridge 20, a transfer roller 12 that transfers the toner image as a developer image formed on a photosensitive drum 21 of the process cartridge 20 to the recording material P. The process cartridge 20 includes the photosensitive drum 21 and a developing device 30 including a charging roller 22, a pre-exposure apparatus 23 and a developing roller 31 disposed around the photosensitive drum 21.

In the present Embodiment, the photosensitive drum 21 is a photosensitive member formed into a cylindrical shape. Incidentally, the photosensitive drum 21 includes a photosensitive layer formed of an organic photosensitive member of negative charge on a drum-shaped substrate formed of aluminum. In addition, the photosensitive drum 21 as an image bearing member is rotationally driven at a predetermined process speed in a predetermined direction (clockwise direction in the drawing) by a motor.

The charging roller 22 contacts the photosensitive drum 21 with a predetermined pressure contact force to form a charging portion. In addition, by applying a desired charging voltage by a charging high voltage power source, a surface of the photosensitive drum 21 is uniformly charged to a predetermined potential.

In the present Embodiment, the photosensitive drum 21 is charged by the charging roller 22 to the negative polarity. The pre-exposure apparatus 23 removes static electricity from a surface potential of the photosensitive drum 21 before entering the charging portion in order to generate a stable discharge in the charging portion.

A scanner unit 11 as an exposure means scans and exposes the surface of the photosensitive drum 21 by irradiating the photosensitive drum 21 with a laser beam corresponding to image information inputted from the external device, using a polygonal mirror. By this, an electrostatic latent image corresponding to the image information is formed on the surface of the photosensitive drum 21. Incidentally, the scanner unit 11 is not limited to a laser scanner device, and, for example, an LED exposure device including an LED array in which a plurality of LEDs are arranged along a longitudinal direction of the photosensitive drum 21 may be employed.

The developing device 30 includes the developing roller 31 for supplying the developer to the developing roller 31 as a developer carrying member for carrying the developer, a developer container 32 which is a frame of the developing device 30, and a supply roller 33 capable of supplying the developer to the developing roller 31. The developing roller 31 and the supply roller 33 are rotatably supported by the developer container 32. In addition, the developing roller 31 is arranged in an opening portion of the developer container 32 so as to face the photosensitive drum 21.

The supply roller 33 is rotatably in contact with the developing roller 31, and the toner as a developer contained in the developer container 32 is supplied to a surface of the developing roller 31 by the supply roller 33. Incidentally, the supply roller 33 is not always required if the toner can be sufficiently supplied to the developing roller 31.

In the present Embodiment, the developing device 30 uses a contact developing method as a developing method. That is, a toner layer carried on the developing roller 31 is in contact with the photosensitive drum 21 in a developing portion (developing region) where the photosensitive drum 21 and the developing roller 31 face each other. A developing voltage is applied to the developing roller 31 by a developing high voltage power source.

Under the developing voltage, the toner carried on the developing roller 31 is transferred from the developing roller 31 to a drum surface in accordance with a potential distribution on the surface of the photosensitive drum 21, so that the electrostatic latent image is developed into the toner image. Incidentally, in the present Embodiment, a reverse development method is employed. That is, the surface of the photosensitive drum is charged in a charging step and then a charge amount is attenuated by the exposure in an exposure step, and the toner adheres to a surface region of the photosensitive drum 21 having the attenuated charge amount, so that the toner image is formed.

In addition, in the present Embodiment, the toner having a particle size of 6 μm and a negative normal charging polarity is used. As an example, the toner of the present Embodiment employs a polymerized toner produced by a polymerization method.

In addition, the toner of the present Embodiment does not contain a magnetic component, and is a so-called non-magnetic one-component developer in which the toner is supported on the developing roller 31 mainly by an intermolecular force or an electrostatic force (mirror image force). However, a one-component developer containing the magnetic component may be used.

In addition to the toner particles, the one-component developer may contain additives (for example, wax or silica fine particles) for adjusting a fluidity and a charging performance of the toner. In addition, as the developer, a two-component developer comprising a non-magnetic toner and a magnetic carrier may be used. When a magnetic developer is used, for example, a cylindrical developing sleeve in which a magnet is arranged inside is used as the developer carrying member.

The developer container 32 is provided with a toner accommodating chamber 36 accommodating the toner and a stirring member 34 as a stirring means disposed inside the toner accommodating chamber 36. The stirring member 34 is driven by a motor (not shown) to stir the toner in the developer container 32, and at the same time, feed the toner toward the developing roller 31 and the supply roller 33. In addition, the stirring member 34 functions to circulate the toner not used for development but stripped off the developing roller 31 in the developer container, thus making uniform the toner in the developer container.

Incidentally, the stirring member 34 is not limited to a rotating type. For example, a stirring member including a swinging shape may be employed instead.

In addition, a developing blade 35 that restricts an amount of the toner carried on the developing roller 31 is arranged in the opening portion of the developer container 32 in which the developing roller 31 is arranged. The toner supplied to the surface of the developing roller 31 passes through a portion facing the developing blade 35 with the rotation of the developing roller 31, so that the toner is uniformly formed into a thin layer and is charged to the negative polarity by triboelectric charging.

Next, the image forming operation of the image forming apparatus 1 will be described.

When a command for image formation is inputted to the image forming apparatus 1, an image forming process by the image forming portion 10 is started based on the image information inputted from an external computer connected to the image forming apparatus 1. The scanner unit 11 irradiates the photosensitive drum 21 with the laser beam based on the inputted image information.

At this time, the photosensitive drum 21 is precharged by the charging roller 22, and the electrostatic latent image is formed on the photosensitive drum 21 by being irradiated with the laser beam. Thereafter, the electrostatic latent image is developed by the developing roller 31, and the toner image is formed on the photosensitive drum 21.

In parallel with the image forming process described above, the recording material P is fed out by the pickup roller 65 and is fed toward a transfer nip formed by the transfer roller 12 and the photosensitive drum 21.

The transfer roller 12 is supplied with a transfer voltage from a transfer high-voltage power source, so that the toner image carried on the photosensitive drum 21 is transferred onto the recording material P.

When the recording material P now carrying the toner image passes through the fixing portion 70, the toner image is heated and pressed. By this, the toner particles are melted and then fixed, so that the toner image is fixed on the recording material P.

The recording material P which has passed through the fixing portion 70 is discharged to an outside of the image forming apparatus 1 (outside the machine) by the discharging roller pair 80 as a discharging means, on a discharge tray 81 as a stacking portion provided at an upper portion of a printer main body 2. A top cover 82 as a stacking tray is provided at the upper portion of the printer main body 2, and the discharge tray 81 as a stacking surface is formed at an upper surface of the top cover 82.

Figure 2:
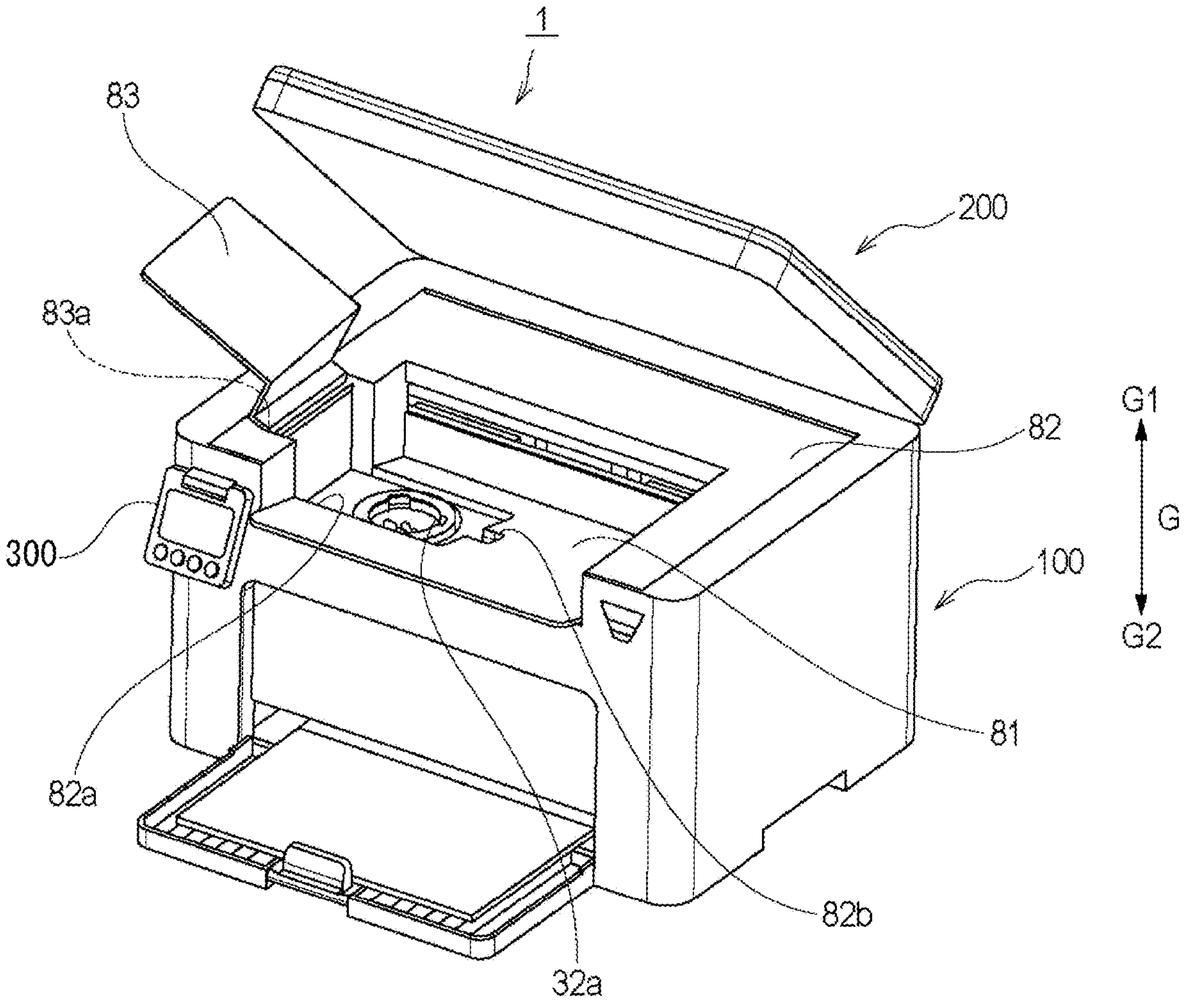
FIG. 2 is a perspective conceptual view illustrating the image forming apparatus with a reading device according to the Embodiment 1 in an opened state.

As shown in FIG. 1(*b*) and FIG. 2, the top cover 82 is provided with an opening/closing member 83 which is supported so as to be openable/closable around a rotation shaft 83*a* extending in a front-rear direction. Incidentally, FIG. 2 is a perspective conceptual view illustrating the image forming apparatus with the reading device according to the Embodiment 1 in an opened state. The discharge tray 81 of the top cover 82 is provided with an opening portion 82*a* which is open upward.

The opening/closing member 83 is movable between a closed position for covering a supply port 32*a* described below in which a toner pack 100 (accommodating container) cannot be mounted to the developer container 32, and an open position in which the supply port 32*a* is exposed so that the toner pack 100 can be mounted to the developer container 32. The opening/closing member 83 functions as a part of the discharge tray 81 in the closed position.

In the present Embodiment, the opening/closing member 83 and the opening portion 82*a* are formed on a left side of the discharge tray 81. In addition, the opening/closing member 83 is opened to a left direction by hooking a finger in a groove portion 82*b* provided in the top cover 82. The open/close member 83 is formed substantially L-shaped along a shape of the top cover 82.

The opening portion 82*a* of the discharge tray 81 is open so that the supply port 32*a* for suppling the toner formed on the upper portion of the developing container 32 (upper side of the image forming apparatus) is exposed, and by opening the opening/closing member 83, a user can access the supply port 32*a*.

Incidentally, in the present Embodiment, a method (direct supply method) in which the user supplies the toner from the toner pack 100 (see FIG. 1(*a*) and FIG. 1(*b*)), which is filled with the toner for suppling, to the developing device 30 while the developing device 30 remains in a state of being mounted to the image forming apparatus 1 is employed. At least a part of the toner pack 100 is exposed to the outside in a state of being mounted to the image forming apparatus 1.

By this, when the remaining amount of the toner in the process cartridge 20 is low, it is not necessary to take out the process cartridge 20 from the printer main body 2 and replace the process cartridge 20 with a new process cartridge, so that usability can be improved.

In addition, the toner can be supplied to the developer container 32 at a lower cost than replacing the entire process cartridge 20. Incidentally, in the direct supply method, it is not necessary to replace various rollers, gears, etc., and therefore, the cost can be reduced, even as compared with a case where only the developing device 30 of the process cartridge 20 is replaced, as well.

Incidentally, the image forming apparatus 1 and the toner pack 100 constitute an image forming system 1000.

(Configuration of Toner Pack)

Next, a configuration of the toner pack 100 (accommodating container) accommodating the toner (powder) of the present Embodiment will be described using FIG. 3, FIG. 4, and FIG. 9. In particular, a "folding shape" and a "fold forming portion" disposed on a side portion of a pouch of the toner pack, which is a character of the present invention, will be explained in detail.

FIG. 3(*a*) and FIG. 3(*b*) are the exploded perspective conceptual views of the toner pack according to the Embodiment 1 viewed from different perspectives.

FIG. 4(*a*) is the perspective conceptual view illustrating a state where a discharge port of the toner pack according to the Embodiment 1 is shuttered.

FIG. 4(*b*) is the perspective conceptual view illustrating a state where the discharge port of the toner pack is opened.

FIG. 9(*a*) is the side conceptual view illustrating a position of the fold forming portion disposed on the side portion of the pouch of the toner pack (before deformation) according to the Embodiment 1. FIG. 9(*b*) is the side conceptual view illustrating the toner pack in a state where the pouch is made to be invisible. FIG. 9(*c*) is the perspective conceptual view illustrating the toner pack in a state where the pouch is made to be invisible.

As mentioned above, the toner pack 100 (accommodating container) is mountable to and dismountable from the image forming apparatus 1 and is an accommodating container having flexibility that can accommodate powder such as the toner.

As shown in FIG. 3 or FIG. 4, in the present Embodiment, the toner pack 100 is provided with primarily a coupling member 102 (communicating member) and a pouch 103.

And the toner pack 100 is further provided with a shutter member 110, a seal member 104, and a base member 101. Incidentally, as shown in FIG. 3, the shutter member 110 is rotatable about an axial direction Z as a rotational center.

(Pouch)

As shown in FIG. 3 or FIG. 9, the pouch 103 is a flexible container-like thing that can accommodate the toner (powder), and is provided with a bottom portion 103*s* and a side portion SB.

The side portion SB of the pouch 103 is constituted as extending from a side of the bottom portion 103*s* to a side of the opening 103*k* so as the opening 103*k* disposed on an opposite side of the bottom portion 103*s* to be formed. In addition, inside of the side portion SB (103*a*) disposed on the side of the opening 103*k*, an "opening inner surface 103*a*" is disposed as described below.

In the present Embodiment, the side portion SB of the pouch 103 is provided with a (first) fold forming portion 75*b* forming a (first) folding shape 75. Incidentally, the fold forming portion 75*b* is formed along an edge portion 102*f* of a top surface 102*t* of the coupling member 102, which will be described below.

In addition, in the present Embodiment, as shown in FIG. 9, the side portion SB of the pouch 103 is provided with a first part K101 and a second part K102 that is connected to the first part and has smaller strength than the first part, and the fold forming portion 75*b* is disposed at a boundary portion K1 between the first part and the second part.

Specifically, in the present Embodiment, since the first part K101 of the side portion SB is welded to an outer circumferential surface 102*b* of the coupling member 102, the first part K101 of the side portion SB is stronger than the second part K102 of the side portion SB. When the side portion SB is pressed, the side portion SB tends to deform along the boundary portion K1. In the present Embodiment, by disposing the fold forming portion 75*b* at the boundary portion K1 between the first part K101 and the second part K102, when the side portion SB is pressed, the side portion SB tends to deform further at a location of the boundary portion K1, and it becomes easier for a crease (folding shape) to be formed.

And at least a part 75*b*0 of the fold forming portion 75*b* is formed at side of the bottom portion 103*s* from the top surface 102*t* of the coupling member 102. For example, as shown in FIG. 9, (the part 75*b*0 of) the fold forming portion 75*b* is formed near a position of the top surface 102*t* with respect to a height direction Z0 connecting the side of the opening 103*k* and the side of the bottom portion 103*s*, and is formed to a position extended to slightly above the top surface 102*t* (above as shown in FIG. 9).

Specifically, when the fold forming portion 75*b* is disposed at the boundary portion K1, by disposing at a position moved more to the side of the bottom portion 103*s* than a position of the top portion 102*t*, a width (deformation width) of the fold forming portion 75*b* becomes slightly wider, and thereby making it easier for the user to press the side portion SB. As a result, it becomes easier for the toner to be discharged from the toner pack.

For example, the part 7560 of the fold forming portion 75*b* may be disposed on the side portion SB in a range from a position of the top surface 102*t* of the coupling member 102 to a position separated by 30 mm from the top surface 102*t* toward the side of the bottom portion 103*s*. By disposing the fold forming portion 75*b* in this range, it becomes easier for the user to press the side portion SB and the toner can be discharged more efficiently. Incidentally, more preferably, the fold forming portion 75*b* is disposed in a range from the position of the top surface 102*t* to a position separated by 15 mm from the top surface toward the side of the bottom portion 103*s*.

As shown in FIG. 9, in the present Embodiment, the side portion SB is provided with a second fold forming portion 76*b* forming a second folding shape 76 at a predetermined interval (distance L8) from the fold forming portion 75*b* toward the side of the bottom portion 103*s*.

By disposing the second fold forming portion, the toner can be discharged from the toner pack more efficiently.

For example, the side portion SB can be provided with a third part K103, a fourth part K104, and a fifth part K105, in order from the side of the opening with respect to the height direction Z0 (axial direction Z). The fourth part K104 connects the third part K103 and the fifth part K105, and is configured to have smaller strength than the third part and the fifth part. The second fold forming portion 76*b* may be formed in the fourth part K104.

By making the strength of the fourth part lower than that of the third part and the fifth part, when deformation occurs around the folding shape 75 due to the pressure, the fourth part K104 is deformed first (easily deformed). Therefore, by disposing the second fold forming portion in the fourth part, when the folding shape 75 is formed by the fold forming portion 75*b*, it becomes easier for the second folding shape 76 to be formed along the second fold forming portion 76*b*. As a result, it becomes easier for the toner in the toner pack to be discharged.

In other words, by disposing the fold forming portion 75*b* and the second fold forming portion 76*b*, when the side portion SB is pressed, the third part K103 of the side portion SB will be closer to the top surface 102*t*, and the fifth part K105 will be closer to an opposite side of the side portion SB. Thus, it becomes easier for the toner in the toner pack to be discharged.

Incidentally, in the present Embodiment, the fold forming portion 75*b* and the second fold forming portion 76*b* are disposed in the side portion SB so as to be substantially parallel to each other, but they do not necessarily be parallel.

As shown in FIG. 9, in the present Embodiment, the side portion SB of the pouch 103 is provided with third fold forming portions 77*b* and 78*b* forming third folding shapes 77 and 78, and the third fold forming portions 77*b* and 78*b* are disposed so as to be crossed with the fold forming portion 75*b*.

By disposing the third fold forming portion, it is possible for the side portion SB to deform more smoothly (following) when deformation occurs around the folding shape 75 and the second folding shape 76. As a result, the toner can be more efficiently discharged from the toner pack.

Incidentally, as shown in FIG. 9, in the present Embodiment, the third fold forming portions 77*b* and 78*b* are also crossed with the second fold forming portion 76*b*, and are disposed on each side across an "axis" of the axial direction Z. In addition, the third fold forming portions 77*b* and 78*b* are inclined with respect to the axial direction Z so that a distance between the third fold forming portions 77*b* and 78*b* increases as it goes from the side of the top surface 102*t* to the side of the bottom portion 103*s*.

As a processing method for the fold forming portions (75*b*-78*b*), a pressing method may be employed for the side portion SB of the pouch 103. Other than the pressing method, a bending method, a thermal processing method or a half-cutting method, or any combination of these methods may be employed for the pouch (103).

(Fold Forming Portion)

Next, a configuration of the "fold forming portion 75*b*" and the "second fold forming portion 76*b*" of the present Embodiment, the processing methods (processing conditions) thereof, and a cross-sectional shape after processing will be described using FIG. 10.

FIG. 10(*a*) is a cross-sectional conceptual view of the fold forming portion (75*b*) of the side portion of the pouch in the toner pack according to the Embodiment 1, and FIG. 10(*b*) is a cross-sectional conceptual view of the second fold forming portion (76*b*) of the side portion of the pouch. Incidentally, FIG. 10 illustrates a cross-sectional view orthogonal to a direction in which each of the fold forming portion 75*b* or the second fold forming portion 76*b* extends (see FIG. 9(*a*)).

The fold forming portion 75*b* of the present Embodiment is formed by the "pressing method" as described above.

Specifically, as shown in FIG. 10(*a*), the fold forming portion 75*b* (mountain fold) is formed by the pressing method from an inside 103*a* so as to be protruded outside from a surface (flat portion SBP1) that is to be an outside 103*b* with respect to the side portion SB of the pouch 103.

That is, the "fold forming portion 75*b*" formed by the pressing method from a surface (side) that is to be the inside 103*a* of the pouch 103 includes a protruding portion SBP2 protruding to the "outside 103*b*" of the pouch from the flat portion SBP1 that is a flat portion (surface) of the outside 103*b* of the side portion SB.

In addition, a protruding direction of the protruding portion SPB2 may be opposite between inside and outside. Furthermore, the same can be applied to a protruding portion SPB4.

In addition, as shown in FIG. 10(*a*), in the present Embodiment, the protruding portion SBP2 constituting the fold forming portion 75*b* has a "protruding-shape" when viewed from outside of the pouch and has a "recessed-shape" when viewed from inside of the pouch.

In addition, in the present Embodiment, a thickness (T2) of the protruding portion SBP2 is substantially the same as a thickness (T1) of the flat portion SBP1. Incidentally, in order to make it easier to form the fold forming portion, the thickness (T2) of the protruding portion SBP2 may be configured to be smaller than the thickness (T1) of the flat portion SBP1.

In addition, in the present Embodiment, a height H1 of the protruding portion SBP2 can be set smaller than the thickness T1 of the flat portion SBP1. By this, it is possible to form the fold forming portion on the pouch more easily and to stabilize a shape of the pouch upon accommodating the toner.

In addition, in the present Embodiment, a width (WE) of the protruding portion SPB2 is larger than the height H1 of the protruding portion SBP2. By this, it is possible to stabilize the shape of the pouch upon accommodating the toner.

In addition, the protruding portion SPB2 has a cross-sectional shape of a smooth circular arc. By this, it is possible to keep a strength of the fold forming portion high.

On the other hand, as shown in FIG. 10(*b*), the second fold forming portion 76*b* (valley fold) is formed by the pressing method from the outside 103*b* so as to be protruded to an opposite direction (opposite side) of the fold forming portion 75*b*. Incidentally, the second fold forming portion 76*b* has basically the same configuration as the fold forming portion 75*b*, except the protruding direction.

Specifically, the second fold forming portion 76*b* is formed by the pressing method from the outside 103*b* so as to be protruded inside from the surface that is to be the inside 103*a* (a flat portion SBP3) with respect to the side portion SB of the pouch 103.

That is, the "second fold forming portion 76*b*" formed by the pressing method from the surface (side) that is to be the outside 103*b* of the pouch 103 includes the protruding portion SBP4 protruding to the "inside 103*a*" of the pouch from the flat portion SBP3 that is the flat portion (surface) of the inside 103*a* of the side portion SB.

In addition, with respect to the thickness T2 and the height H1 of the protruding portion SBP4 of the second fold forming portion 76*b*, it is possible to configure in the same manner as the fold forming portion 75*b*.

Incidentally, with respect to other fold forming portions (e.g., the third fold forming portions 77*b* and 78*b*), conditions of the pressing method (e.g., a pressing direction) can be altered depending on the "mountain fold" or the "valley fold", as the fold forming portion 75*b* (mountain fold) or the second fold forming portion 76*b* (valley fold).

In addition, the fold forming portion 75*b* (or the second fold forming portion 76*b*) may have a cross-sectional shape (modification example), for example, as shown in FIG. 11(*a*) and FIG. 11(*b*) other than the cross-sectional shape shown in FIG. 10.

FIG. 11(*a*) is a cross-sectional conceptual view of the fold forming portion of the side portion of the pouch in the toner pack according to a "modification example 1" of the Embodiment 1, and FIG. 11(*b*) is a cross-sectional conceptual view of the fold forming portion of the side portion of the pouch in the toner pack according to a "modification example 2" of the Embodiment 1. Incidentally, FIG. 11 illustrates a cross-sectional view orthogonal to a direction in which the fold forming portion 75*b* in each of the modification example 1 and the modification example 2 extends (see FIG. 9(*a*)).

Specifically, a cross-sectional shape of the fold forming portion 75*b* shown in FIG. 11(*a*) may be formed by the pressing method or by a cutting method. Specifically, a predetermined groove shape is formed by pressing a metal mold onto the surface of the inside 103*a* of the side portion SB with respect to a thickness direction. In addition, a method of pressing the metal mold in a state of being heated may be employed. Furthermore, the cross-sectional shape as shown in FIG. 11(*a*) may also be formed by a process cutting the surface of the inside 103*a* with a blade. By this, it becomes easier for the fold forming portion 75*b* to be the "mountain fold" shape. Incidentally, with respect to the second fold forming portion 76*b* (valley fold), similar to the Embodiment 1, the predetermined groove shape may be formed in the opposite direction (side) of the fold forming portion 75*b*.

In addition, a cross-sectional shape of the fold forming portion 75*b* shown in FIG. 11(*b*) may be formed by a cutting process method. Specifically, the cross-sectional shape as shown in FIG. 11(*b*) can be formed also by a process cutting the surface of the inside 103*a* of the side portion SB with a blade. By this, the predetermined groove shape is formed. By this, it becomes easier for the fold forming portion 75*b* to be the "mountain fold" shape. Incidentally, with respect to the second fold forming portion 76*b* (valley fold), similar to the Embodiment 1, the predetermined groove shape may be formed in the opposite direction (side) of the fold forming portion 75*b*.

In addition, the same can be applied to the other fold forming portions (e.g., the second fold forming portion and the third fold forming portions).

(Coupling Member)

As shown in FIG. 3 or FIG. 9, the coupling member 102 (communicating member) is substantially cylindrical and provided with an outer circumferential surface 102*a*, an inner circumferential surface 102*b* (hole portion), and the top surface 102*t* (opposite surface) opposing the bottom portion 103*s* of the pouch. The coupling member 102 is attached to the inside the pouch on the side of the opening (opening inner surface 103*a*).

The outer circumferential surface 102*a* of the coupling member 102 is a surface of the side portion SB of the pouch 103 that is welded in order to couple with the opening inner surface 103*a*. On the other hand, the inner circumferential surface 102*b* constitutes the "hole portion" into which the base member 101, described below, is inserted.

Incidentally, the base member 101 has a "discharge path 101*h* (communicating portion)" that communicates inside and outside of the pouch 103, as described below. The base member 101 and the coupling member 102 constitute the "communicating member" of the present invention.

In the coupling member 102, a "recessed portion 102*c*" as described below is also formed.

In the present Embodiment, the coupling member 102 and the pouch 103 are constituted by resin of the same material, and the coupling member 102 is attached to the inside the pouch 103 on the side of the opening (opening inner surface 103*a*) by welding. Incidentally, after the coupling member 102 is attached to the pouch 103, the toner is filled in the pouch 103. Then, the base member 101 described below is attached further to the coupling member 102.

In addition, in the present Embodiment, the outer circumferential surface 102*a* of the coupling member 102 is provided with a welded portion 1021, and the coupling member is attached to the inside the pouch on the side of the opening by welding the welded portion 1021 inside the side portion SB (opening inner surface 103*a*).

In the present Embodiment, the welded portion 1021 is provided with a first welded portion 102*g* (welded rib) and a second welded portion 102*h* (welded rib) in a direction L50 along a first direction L5 in which the crease (line) 751 of the folding shape 75 (see FIG. 7) extends. That is, when viewed along a direction orthogonal to the height direction Z0 and the first direction L5, the first welded portion 102*g* and the second welded portion 102*h* are disposed to be protruding outside from the outer circumferential surface 102*a* along the first direction L5 (direction L50).

Incidentally, in the present Embodiment, the direction L50 is illustrated as extending in the "same" direction as the direction L5, but the direction L50 need not necessarily be the "same" direction as the direction L5, as long as the direction L50 is along the direction in which the direction L5 extends. In addition, in the present Embodiment, the direction L5 is illustrated as being "orthogonal" to the height direction Z0, but it need not necessarily be "orthogonal" and the direction L5 may be configured to be crossed with the height direction Z0.

The first welded portion 102*g* and the second welded portion 102*h* both extend further outside from the edge portion 102*f* and are disposed on different sides of the coupling member 102 with respect to the first direction L5 (direction L50). By disposing the first welded portion 102*g* and the second welded portion 102*h*, it is possible for the coupling member to be more easily and securely attached to the pouch upon welding the coupling member to the pouch 100.

In addition, the edge portion 102*f* of the top surface 102*t* is provided with a linear portion SL having a linear shape extending in a direction L51 along the first direction L5. Incidentally, in the present Embodiment, the direction L51 is illustrated as extending in the "same" direction as the direction L5, but the direction L51 need not necessarily be the "same" direction as the direction L5, as long as the direction L51 is along the direction in which the direction L5 extends.

The linear portion SL is disposed so as to be positioned between the first welded portion 102*g* and the second welded portion 102*h* with respect to the first direction L5 (direction L51) when viewed along a direction crossed with the height direction Z0 and the first direction L5. Incidentally, as shown in FIG. 9(*d*), the linear portion SL includes a first linear portion SL1 and a second linear portion SL2 which are parallel to each other.

By disposing the first linear portion SL1 and the second linear portion SL2 extending in the direction L51 between the first welded portion 102*g* and the second welded portion 102*h*, it is possible for the coupling member to be easily welded to the pouch and for the folding shape (fold forming portion) to be easily formed on the side portion SB of the pouch.

When the coupling member 102 is viewed along the height direction Z0 (axial direction Z) connecting the side of the opening 103*k* and the side of the bottom portion 103*s*, the top surface 102*t* of the coupling member has a substantially hexagonal shape. The first welded portion 102*g* and the second welded portion 102*h* are disposed at a pair of opposite corner portions AN1 and AN2 of the hexagon.

Upon coupling the opening inner surface 103*a* of the pouch 103 and the outer circumferential surface 102*a* of the coupling member 102, a space between a first corner portion 103*x* and a second corner portion 103*y* of the opening 103*k* is filled with the first welded portion 102*g* and the second welded portion 102*h*. By this, it is possible to weld areas that are difficult to couple upon welding more easily.

Incidentally, the coupling method may be any methods known to a person having ordinally skill in the art, for example, a method using various adhesives such as hot melt, a method coupling the pouch 103 to the outer circumference of the coupling member 102 by heat welding, etc.

Incidentally, when the pouch 103 and the coupling member 102 are constituted by resin of the same material and coupled by heat welding, a combined unit does not contain a part made of different materials, and thereby making it easier to recycle, etc., and it is possible to contribute to a reduction in environmental impact.

(Base Member)

Next, the base member 101 will be described using FIG. 3 and FIG. 8. The base member 101 and the coupling member 102 together constitute the "communicating member" of the present invention, communicating inside and outside of the pouch 103.

FIG. 8 is a perspective conceptual view illustrating a state where supply is completed of the toner pack according to the Embodiment 1.

As shown in FIG. 3 or FIG. 8, in the present Embodiment, a portion (shaft portion 101*a*) of the base member 101 is inserted into the inner circumferential surface 102*b* (hole portion) of the substantially cylindrical "coupling member 102" and is integrated by engaging. That is, the "communicating member" may be configured by integrating two (or more) components (members), or it may be configured of a single component (member).

Specifically, as shown in FIG. 3 or FIG. 8, the base member 101 is provided with a top surface 101*s* (opposite surface), an outer circumferential surface 101*b*, a toner outlet 101*r*, and the shaft portion 101*a*.

Incidentally, the top surface 101*s* (opposite surface) is opposing the bottom portion 103*s* of the pouch 103. The toner outlet 101*r* is formed in the outer circumferential surface 101*b*. The shaft portion 101*a* engages with the inner circumferential surface 102*b* (hole portion) of the coupling member 102.

The base member 101 is provided with the "discharge path 101*h*" as a discharge hole for discharging the toner inside the toner pack 100. The discharge path 101*h* communicates from the side of the top surface 102*t* (opposite surface) and the top surface 101*s* (opposite surface) to a side of the discharge port 101*r*, and communicates between inside and outside of the toner pack 100.

By this, it is possible for the toner accommodated in the pouch 103 to be discharged outside the toner pack 100 through the toner outlet 101*r*.

In addition, as it can be understood from FIG. 8, the top surface 101*s* (opposite surface) is formed as a conical shape and as an inclined surface so that a surface descends as it approaches the discharge path 101*h* (center). By this, it makes easier for the user to deform the side portion SB along the folding shape 75. In particular, in a latter half of a toner discharge operation, it becomes possible to push an inner surface 103*p*1 (third part K103) and the inner surface 103*p*2 (third part K103) of the pouch 103 of the toner pack 100 further toward the side of the top surface 101*s* (inclined surface).

By this, it becomes possible for the discharge of the toner to be realized more efficiently. That is, it makes possible for the pouch 103 to be deformed more toward a side of the discharge path 101*h* along the top surface 101*s* (inclined surface) connected to the discharge path 101*h*. As a result, a volume in the pouch 103 can be more reliably reduced, and it makes a supplying operation of the toner easier and thereby improving usability.

As shown in FIG. 3, the base member 101 is provided with a protruding portion 101*x* and a protruding portion 101*y* that engage with recessed portions 102*c* of the coupling member 102.

It is possible to regulate a relative movement of both components except in a rotational direction by engaging the inner circumferential surface 102*b* (hole portion) with the shaft portion 101*a*. In addition, it is also possible to further regulate a relative movement of both components in the rotational direction by engaging the recessed portions 102*c* with the protruding portion 101*x* and the protruding portion 101*y*. By this, the base member 101 is held by the coupling member 102 without the relative movement.

The seal member 104 is constituted by a material such as an elastically deformable urethane foam, a non-woven fabric, etc. The seal member 104 is fixed to a surface 110*f* of the shutter member 110 with a double-sided tape, etc. By this, it is possible to suppress a toner leakage at an interface between the seal member 104 and the shutter member 110.

In addition, as shown in FIG. 4, the toner pack 100 is configured so that the shutter member 110 can rotate relative to the base member 101. In addition, the shutter member 110 is disposed to be rotatable in a Z1 direction and in a Z2 direction opposite to the Z1 direction, with the axial direction Z as a rotational center.

For example, the toner pack 100 will be in an "open state" as shown in FIG. 4(*b*) from a "shuttered state" as shown in FIG. 4(*a*) by turning the shutter member 110 in the Z1 direction. Conversely, the toner pack 100 can be switched to the "shuttered state" from the "open state" by turning the shutter member 110 in the Z2 direction.

In the "open state" shown in FIG. 4(*b*), the toner accommodated in the pouch 103 can be discharged (supplied) outside (image forming apparatus 1) the toner pack 100.

(Coupling of the Toner Pack and the Supply Port)

Next, a preparatory operation for the user to supply the toner in the toner pack 100 to the developer container 32 of the image forming apparatus 1 by coupling the toner pack 100 and the supply port 32*a* of the image forming apparatus 1 will be described using FIG. 5.

FIG. 5(*a*) is a perspective conceptual view illustrating a state just before the toner pack according to the Embodiment 1 is mounted on the supply port, and FIG. 5(*b*) is a perspective conceptual view illustrating a state where the toner pack is mounted on the supply port.

In the present Embodiment, the image forming apparatus 1 is provided with the supply port 32*a* (mounting portion) and a supplying operation can be performed by setting the toner pack 100 on the supply port.

Incidentally, as mentioned above, in an attitude in use, the supply port 32*a* is disposed on the upper side of the image forming apparatus 1 (see FIG. 2).

As shown in FIG. 5, the toner pack 100 is mounted on the supply port 32*a* in an attitude in which the bottom portion 103*s* is positioned above G1 with respect to a gravity direction G and the opening 103*k* is positioned below G2 with respect to the gravity direction G.

Incidentally, in the present Embodiment, the toner pack 100 is mounted on and dismounted from the supply port 32*a* along a direction G0 which is along the gravity direction G.

More specifically, the user aligns the height direction Z0 (axial direction Z) of the toner pack with the direction G0 and mounts the toner pack 100 on the supply port 32*a* along the direction G0.

After mounting, the user grips a gripping portion 310*a* of an operating lever 310 and rotates the operating lever 310 in the Z1 direction with the axial direction Z as the rotational center. Then, the shutter member 110 of the toner pack 100 rotates to be the "open state" (see FIG. 4(*b*)).

Conversely, when the user turns the toner pack 100 from the "open state" to the "shuttered state" (see FIG. 4(*a*)), the user may rotate the operating lever 310 in the Z2 direction with the axial direction Z as the rotational center.

Incidentally, in the present Embodiment, the toner pack 100 is constituted to be mounted on the supply port 32*a* and supplies a developer to the image forming apparatus 1 during non-image formation when the image forming operation is not performed, and dismounted from the supply port 32*a* before starting the image forming operation.

(Toner Supply Operation With the Toner Pack)

Next, a supply operation for supplying the toner from the toner pack 100 mounted on the image forming apparatus 1 (supply port 32*a*) and its relationship to the "folding shape" will be described using FIG. 6, FIG. 7 and FIG. 8.

FIG. 6 is a perspective conceptual view illustrating a method discharging a toner from the toner pack according to the Embodiment 1.

FIG. 7(*a*), FIG. 7(*b*) and FIG. 7(*c*) are perspective conceptual views of the toner pack according to the Embodiment 1 in a state where supply is completed viewed from different perspectives. FIG. 7(*d*) is a perspective conceptual view illustrating the toner pack in a state where the pouch is made to be invisible. Incidentally, FIG. 7(*a*) illustrates a perspective conceptual view of the toner pack of which a discharging of the toner is completed, viewed from a side portion SB1 of one side. FIG. 7(*c*) illustrates a perspective conceptual view of the toner pack of which the discharging of the toner is completed, viewed from a side portion SB2 of the other side.

As mentioned above, upon supplying the toner to the image forming apparatus 1, the toner pack 100 is mounted on the supply port 32*a* of the image forming apparatus 1. While the toner pack 100 is mounted, the toner accommodated in the toner pack 100 is discharged from the toner pack 100 and supplied into the developer container 32 via the supply port 32*a*.

First, a method for discharging the toner accommodated in the toner pack 100 is described.

As shown in FIG. 6, it is configured for the user to supply the toner of the pouch 103 to the developer container 32 by deforming the pouch 103. Therefore, it is necessary for the pouch 103 to be configured to be easily deform. The toner accommodated in the toner pack 100 is discharged by the user deforming the pouch 103 and reducing the volume in the pouch 103.

The pouch 103 has flexibility so that the user can deform, and a material and a shape of the pouch 103 may be what is known to a person having ordinal skill in the art as well. In addition, with respect to the method for discharging the toner from the pouch 103, it is preferable for the user to squeeze the pouch 103 with fingers, when the pouch 103 has flexibility.

As mentioned above, the fold forming portion 75*b* is disposed along the edge portion 102*f* of the top surface 102*t* on the side portion of the pouch 103. By this, it becomes easier for the side portion SB to deform along the fold forming portion 75*b* when the user presses the side portion SB of the pouch with fingers to discharge the toner.

That is, as shown in FIG. 7, in the toner pack 100 of the present Embodiment, in a state where the toner inside the toner pack 100 is discharged, the side of the opening 103*k* of the pouch 103 is folded with the first folding shape 75 being formed along the edge portion 102*f* of the top surface 102*t* of the coupling member 102.

Specifically, in the present Embodiment, the edge portion 102*f* of the top surface 102*t* includes six sides SL1-SL6 of the hexagon. With respect to the first direction L5, a middle side SL1 and a middle side SL2 are disposed between the first welded portion 102*g* and the second welded portion 102*h*, and both of the middle side SL1 and the middle side SL2 are substantially parallel to the first direction L5.

On both sides of one of the middle side SL1, a lower side SL3 and an upper side SL4 are disposed so as to be adjacent to the middle side SL1, and also on both sides of the other of the middle side SL2, a lower side SL5 and an upper side SL6 are disposed so as to be adjacent to the middle side SL2. An outer shape of the edge portion 102*f* of the coupling member 102 is "line symmetrical" with respect to a straight line (the first direction L5) passing through the first welded portion 102*g* and the second welded portion 102*h*. That is, the top surface 102*t* of the coupling member 102 is "substantially hexagon" when viewed from the axial direction Z.

A folding shape 75*a* is formed in the mountain fold along one of the middle side SL1 of the edge portion 102*f*, and folding shapes 75*a*1 and 75*a*2 are formed in the valley fold along the lower side SL3 and the upper side SL4.

Similarly, the folding shape 75*a* is formed along the other of the middle side SL2, and folding shapes (not shown) are formed along the lower side SL5 and the upper side SL6.

In the present Embodiment, the (first) folding shape 75 should include at least the folding shape 75*a*, and it is more preferable to include all of the folding shapes 75*a*, 75*a*1, and 75*a*2. That is, it is sufficient to provide the fold forming portion 75*b* corresponding to the folding shape 75*a*, and it is more preferable to provide the fold forming portion 75*b* corresponding to all of the folding shapes 75*a*, 75*a*1, and 75*a*2.

Here, in the present Embodiment, the middle side SL1 (SL2) is a "straight (straight line) shape". By this, it becomes easier for the (mountain) folding shape 75*a* to be formed.

Thus, by disposing the fold forming portion 75*b* forming the folding shape 75 near the edge portion 102*f* of the coupling member 102 (communicating member), it becomes possible to actively guide a position where the flexible side portion SB is deformed. By this, it becomes possible for the toner in the toner pack to be discharged more efficiently.

As mentioned above, the second fold forming portion 76*b* is disposed on the side portion of the pouch 103 at a predetermined interval (distance L8) from the fold forming portion 75*b* toward the side of the bottom portion 103. By this, it becomes easier for the second fold forming portion 76 to be formed as the folding shape 75 is formed by the fold forming portion 75*b*. Thus, it makes the deformation of the side portion SB more smoothly and the toner can be discharged more efficiently.

That is, as shown in FIG. 7, the toner pack 100 of the present Embodiment is folded with the second (valley) folding shape 76 formed in the state where the toner inside the toner pack 100 is discharged.

As mentioned above, the side portion SB of the pouch 103 is disposed to be crossed with the fold forming portion 75*b* and the third fold forming portions 77*b* and 78*b* are disposed on the side portion SB. By this, it becomes easier for the third folding shapes 77 and 78 to be formed as the folding shape 75 and the second folding shape 76 are formed, thereby making the deformation of the side portion SB more smoothly and it becomes possible for the toner to be discharged more efficiently.

Specifically, the third folding shapes 77 and 78 are formed so as to be crossed with the first folding shape 75 and the second folding shape 76 and form "mountain folds" in a widening direction toward the bottom portion 103*s*.

That is, the third folding shapes 77 and 78 are formed from both ends SL1*a* and SL1*b* of the middle side SL1 toward both ends 76*a* and 76*b* of the second folding shape 76.

By disposing the fold forming portion, it becomes easier for an inner surfaces of one side of the side portion SB1 and the other side of the side portion SB2 of the pouch 103 to be deformed so as to be in contact with the top surface 102*t* of the coupling member. And it becomes easier for the volume inside the pouch 103 to be reduced as the inner surfaces of the side portion SB1 and the side portion SB2 of the pouch 103 are in contact with each other.

Thus, as the "folding shape" is formed by disposing the first fold forming portion, the second fold forming portion and the third fold forming portion, it becomes easier for the side portion SB of the pouch to be deformed more smoothly, and it becomes possible for the toner in the toner pack 100 to be discharged more efficiently.

That is, it becomes possible for the pouch 103 of the toner pack 100 to be easily deformed and folded so as the volume of the pouch 103 to be as close to minimum as possible. In other words, when the user supplies the toner to the image forming apparatus 1 using the toner pack 100, it is easier for the user to deform the pouch 103 and to supply the toner, and thereby improving usability.

Incidentally, in the present Embodiment, a configuration provided with the first fold forming portion, the second fold forming portion and the third fold forming portion is described, however, it is sufficient to include at least the first fold forming portion.

In addition, as shown in FIG. 9, when the distance from the edge portion 102*f* to the second fold forming portion 76*b* is defined as the distance L8 and a distance from the first middle side SL1 to the second middle side SL2 of the top surface 102*t* of the coupling member is defined as a distance L9, a relationship between the distance L8 and the distance L9 should be as following.

$$L8 \geq L9/2$$

That is, the interval between the "first fold forming portion 75*b*" and the "second fold forming portion 76*b*" with respect to the height direction Z0 can be set as the "distance L8". On the other hand, the "distance L8" can be set larger than the shortest distance (L9/2) from a position where the first fold forming portion 75*b* is formed in the edge portion 102*f* of the top surface 102*t* of the coupling member 102 (the first middle side SL1 or the second middle side SL2) to a center position S01 of the top surface 102*t*.

By this, it becomes possible for the inner surfaces of the side portion SB1 and the side portion SB2 to be deformed so as to be in contact with the top surface 102*t* of the coupling member with little space or slack. And the inner surfaces of the side portion SB1 and the side portion SB2 of the pouch 103 are in contact with each other, and the volume in the pouch 103 is more likely to be reduced.

Incidentally, in the present Embodiment, the opening of the discharge path 101*h* is formed near the center position S01 of the top surface 102*t* of the coupling member 102. In addition, a center of the top surface 102*t* and a center of the opening of the discharge path 101*h* are disposed so as to overlap.

As mentioned above, the outer circumferential surface 102*a* of the coupling member 102 and the inner surface 103*a* of the opening of the pouch 103 are coupled by means of "heat welding", etc. That is, with respect to the axial direction Z, a coupled portion of which a range of a region W is coupled (welded) constitutes the first part K101.

Here, the first part (coupled portion) is an integral constitution by the coupling member 102 made of resin or metal material and the pouch 103 (side portion SB), and a strength of the first part as rigidity with respect to a bending direction is higher than that of the second part K102. As mentioned above, it becomes easier for the (first) folding shape 75 to be formed by disposing the (first) fold forming portion 75*b* at the boundary portion K1 between the first part K101 and the second part K102.

Therefore, it becomes easier for the pouch 103 to be deformed and for the toner to be supplied, and thereby improving usability. Incidentally, a means for differentiating the strength of the side portion SB is not limited to the aforementioned configuration. For example, a thickness of the side portion SB itself of the pouch 103 may be partially varied, and a supporting (reinforcing) member may be attached to a portion of the pouch.

Incidentally, in the Embodiment 1 described above, the "fold forming portion" for the user to easily form the "folding shape" during supplying the toner is described, but it is also possible to make a certain degree of the "folding shape" be formed on the side portion of the pouch in advance. In addition, in this configuration, the same effect as described above can also be achieved.

For example, the toner pack 100 may include the flexible pouch 103 and the coupling member 102, and, on the side portion SB, the folding shape 75 may be formed along the edge portion 102*f* of the top surface 102*t* of the coupling member 102.

In addition, similarly, on the side portion SB, the second fold forming portion 76 may be formed at a predetermined distance L8 from a position of the folding shape 75 toward the side of the bottom portion 103*s*. Then, on the side portion SB, the third folding shapes 77, 78 may be formed connecting the folding shape 75 and the second folding shape 76.

Thus, by disposing the "folding shape" or the "fold forming portion" on the side portion of the pouch, it becomes easier for the pouch 103 to be deformed, and it makes possible for the toner to be supplied more efficiently and smoothly, and thereby improving usability.

Incidentally, the "folding shape" or the "fold forming portion" may be disposed on both sides of the side portion SB (the first side portion SB1 and the second side portion SB2), or only on one side. Incidentally, it is preferable to dispose the "folding shape" or the "fold forming portion" on both sides than only on one side, since it becomes easier for the toner (powder) to be discharged when it is disposed on both sides.

Embodiment 2

The Embodiment 2 will be described below using FIG. 12.

Incidentally, the Embodiment 2 has basically the same configuration as the toner pack 100 according to the Embodiment 1, therefore, differences will be described below.

FIG. 12 is a perspective conceptual view illustrating a toner pack according to an Embodiment 2 in a state where a pouch is made to be invisible.

As shown in FIG. 12, in the toner pack 100 of the present Embodiment, when a coupling member 102 is viewed along a height direction Z0 connecting a side of an opening 103*k* and a side of a bottom portion 103*s*, a top surface 102*t* (opposite surface) has a "deformed shape". That is, with respect to the "hexagonal" shape according to the Embodiment 1 as shown in FIG. 9(*c*), the "linear portions" that constitute the two middle sides (SL1 and SL2) of the hexagon are altered to "curved portions".

Specifically, the top surface 102*t* (deformed shape) of the Embodiment 2 is constituted by a first curved portion CL1, a second curved portion CL2, a first linear portion SL3, a second linear portion SL5, a third linear portion SL4, and a fourth linear portion SL6.

One end of the second linear portion SL5 is connected to one end of the first linear portion SL3 so as to form a first interior angle A1 therebetween.

In addition, one end of the fourth linear portion SL6 is connected to one end of the third linear portion SL4 so as to form a second interior angle A2 therebetween.

On the other hand, the first curved portion CL1 connects the other end of the first linear portion SL3 and the other end of the third linear portion SL4, and the second curved portion CL2 connects the other end of the second linear portion SL5 and the other end of the fourth linear portion SL6.

In other words, in the present Embodiment, the curved portion CL1 of an edge portion 602*f* of the coupling member 102 is formed as a circular arc shape tangent to the middle side SL1 (imaginary line), the lower side SL3 (imaginary line), and the upper side SL4 (imaginary line) of the Embodiment 1. That is, the imaginary lines SL1, SL3, and SL4 are tangent lines of the "circular arc" of the curved portion CL1. Therefore, the edge portion 602*f* of the Embodiment 2 does not have inflection points P1 and P2 as in the Embodiment 1.

In other words, the first curved portion CL1 is constituted by a first circular arc portion CL1*s* and the second curved portion CL2 is constituted by a second circular arc portion CL2*s*. The first circular arc portion and the second circular arc portion have the same radius of curvature.

In addition, the first interior angle A1 and the second interior angle A2 are the same obtuse angle.

And, in the present Embodiment, similar to the Embodiment 1, a welded portion 1021 is provided with a first welded portion 102*g* and a second welded portion 102*h*. The first welded portion 102*g* extends outside from a position corresponding to a vertex TP1 of the first interior angle A1. The second welded portion 102*h* extends outside from a position corresponding to a vertex TP2 of the second interior angle A2.

In addition, similar to the Embodiment 1, also in the Embodiment 2, a relationship between a distance L8 (see FIG. 9(*a*)) and a distance L9 (see FIG. 9(*c*)) should be as following.

$$L8 \geq L9/2$$

That is, an interval between a "first fold forming portion 75*b*" and a "second fold forming portion 76*b*" with respect to the height direction Z0 can be set as the "distance L8". On the other hand, the "distance L8" can be set larger than the shortest distance (L9/2) from a position where the first fold forming portion 75*b* is formed in an edge portion 102*f* of the top surface 102*t* of the coupling member 102 (the first middle side SL1 shown with the imaginary line) to a center position S01 of the top surface 102*t*.

The Embodiment 2 has the same effects as the Embodiment 1. That is, it becomes easier for the pouch 103 of the toner pack 100 to be deformed and for the toner to be supplied, and thereby improving usability. Furthermore, in the Embodiment 2, by the inflection points P1 and P2 being eliminated, it becomes possible to suppress a local concentration of stress acting on the pouch 103 when the pouch 103 is deformed during the supplying operation, and it also becomes possible to suppress breakage, etc. of the pouch.

INDUSTRIAL APPLICABILITY

According to the present invention, an accommodating container capable of accommodating powder and an image forming system are provided.

The present invention is not limited to the above embodiments, and various changes and variations are possible without departing from the spirit and scope of the present invention. Therefore, the following claims are attached to publicly disclose the scope of the present invention.

This application claims priority on the basis of Japanese Patent Application 2020-207264 filed on Dec. 15, 2020, and Japanese Patent Application 2021-172315 filed on Oct. 21, 2021, which are hereby incorporated by reference herein in its entirety.

The invention claimed is:

1. An accommodating container for accommodating powder, the accommodating container comprising:

a flexible pouch including a bottom portion and a side portion extending from the bottom portion to an opening so as to form the opening;

a communicating member disposed inside the side portion on a side of the opening and provided with a communicating portion communicating between inside and outside of the pouch; and a welded portion protruding from an outer circumferential surface of the communicating portion so as to fill a gap between the communicating portion and the inside of the side portion and welded to an inner surface of the side portion, wherein both the communicating portion and the welded portion are fixed at the inside of the opening of the side portion of the pouch, wherein the communicating member includes an opposite surface opposing the bottom portion, and wherein the welded portion is provided with a first welded portion extending outward from one end of the communicating member in a first direction and a second welded portion extending outward in a direction opposite to the first welded portion in the first direction from an other end of the communicating member, with the first direction crossing a direction in which the accommodating container is mountable to a supply port of a printer main body of an image forming apparatus.

2. An accommodating container according to claim 1, wherein an edge portion of the opposite surface is provided with a linear portion having a linear shape and extending in the first direction, and wherein the linear portion is positioned between the first welded portion and the second welded portion with respect to the first direction.

3. An accommodating container according to claim 2, wherein the linear portion includes a first linear portion and a second linear portion that are parallel to each other.

4. An accommodating container according to claim 1, wherein, when the communicating member is viewed along a height direction connecting the side of the opening and the side of the bottom portion, an outer shape of the opposite surface is a hexagon, and wherein the first welded portion and the second welded portion are disposed at a pair of opposite corner portions of the hexagon.

5. An accommodating container according to claim 1, wherein, when the communicating member is viewed along a height direction connecting the side of the opening and the side of the bottom portion, the opposite surface has a deformed shape and is provided with:

a first linear portion, a second linear portion of which one end is connected to one end of the first linear portion so as to form a first interior angle therebetween, a third linear portion, a fourth linear portion of which one end is connected to one end of the third linear portion so as to form a second interior angle therebetween, a first curved portion connecting the other end of the first linear portion and the other end of the third linear portion, and a second curved portion connecting the other end of the second linear portion and the other end of the fourth linear portion.

6. An accommodating container according to claim 5, wherein the first curved portion is constituted by a first circular arc portion and the second curved portion is constituted by a second circular arc portion.

7. An accommodating container according to claim 6, wherein the first circular arc portion and the second circular arc portion have a same radius of curvature.

8. An accommodating container according to claim 5, wherein the first interior angle and the second interior angle are a same obtuse angle.

9. An accommodating container according to claim 5, wherein the welded portion is provided with a first welded portion extending outside from a position corresponding to a vertex of the first interior angle, and a second welded portion extending outside from a position corresponding to a vertex of the second interior angle.

* * * * *